US010269072B2

(12) United States Patent
Faier

(10) Patent No.: US 10,269,072 B2
(45) **Date of Patent: *Apr. 23, 2019**

(54) CONSOLIDATED PRICE LEVEL EXPANSION

(71) Applicant: Trading Technologies International, Inc., Chicago, IL (US)

(72) Inventor: Adam J. Faier, Palatine, IL (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/682,256

(22) Filed: Aug. 21, 2017

(65) Prior Publication Data

US 2017/0372424 A1 Dec. 28, 2017

Related U.S. Application Data

(63) Continuation of application No. 14/176,471, filed on Feb. 10, 2014, now Pat. No. 9,773,279, which is a continuation of application No. 13/927,797, filed on Jun. 26, 2013, now Pat. No. 8,688,568, which is a continuation of application No. 12/843,618, filed on Jul. 26, 2010, now Pat. No. 8,510,206.

(51) Int. Cl.
*G06Q 40/04* (2012.01)
*G06F 3/0481* (2013.01)
*G06Q 40/06* (2012.01)

(52) U.S. Cl.
CPC ........... *G06Q 40/04* (2013.01); *G06F 3/0481* (2013.01); *G06Q 40/06* (2013.01)

(58) Field of Classification Search
CPC ........ G06Q 40/04; G06Q 40/06; G06Q 40/00; G06T 11/206
See application file for complete search history.

(56) References Cited

U.S. PATENT DOCUMENTS 3,792,462 A 2/1974 Casey et al.
4,674,044 A 6/1987 Kalmus et al.
(Continued)

FOREIGN PATENT DOCUMENTS

CA 2401664 A1 9/2001
CA 2404880 A1 9/2002
(Continued)

OTHER PUBLICATIONS

APT: A trading system for the future, The London International Financial Futures Exchange (LIFFE), 1990, 11 pages.
(Continued)

*Primary Examiner* — Mohammad Z Shaikh
(74) *Attorney, Agent, or Firm* — McDonnell Boehnen Hulbert & Berghoff LLP

(57) ABSTRACT

Certain embodiments provide consolidated price level expansion. Data associated with the individual price levels represented by a consolidated price level is expanded and provided through an expanded consolidated price level interface. In certain embodiments, the expanded consolidated price level interface includes a pop-up interface. In certain embodiments, the expanded consolidated price level interface includes an in-line interface. In certain embodiments, an order may be entered using the expanded consolidated price level interface.

12 Claims, 15 Drawing Sheets

(56) References Cited

U.S. PATENT DOCUMENTS 4,750,135 A 6/1988 Boilen
4,903,201 A 2/1990 Wagner
5,038,284 A 8/1991 Kramer
5,077,665 A 12/1991 Silverman et al.
5,101,353 A 3/1992 Lupien et al.
5,136,501 A 8/1992 Silverman et al.
5,270,922 A 12/1993 Higgins
5,297,031 A 3/1994 Gutterman et al.
5,297,032 A 3/1994 Trojan et al.
5,675,746 A 10/1997 Marshall
5,689,651 A 11/1997 Lozman
5,689,652 A 11/1997 Lupien et al.
5,752,025 A 5/1998 Shakib et al.
5,768,158 A 6/1998 Adler et al.
5,774,877 A 6/1998 Patterson, Jr. et al.
5,774,878 A 6/1998 Marshall
5,793,301 A 8/1998 Patterson, Jr. et al.
5,797,002 A 8/1998 Patterson, Jr. et al.
5,845,266 A 12/1998 Lupien et al.
5,873,071 A 2/1999 Ferstenberg et al.
5,915,245 A 6/1999 Patterson, Jr. et al.
5,924,082 A 7/1999 Silverman et al.
5,924,083 A 7/1999 Silverman et al.
5,926,801 A 7/1999 Matsubara
5,946,667 A 8/1999 Tull, Jr. et al.
5,950,177 A 9/1999 Lupien et al.
5,963,923 A 10/1999 Garber
6,012,046 A 1/2000 Lupien et al.
6,014,643 A 1/2000 Minton
6,035,287 A 3/2000 Stallaert et al.
6,073,115 A 6/2000 Marshall
6,098,051 A 8/2000 Lupien et al.
6,131,087 A 10/2000 Luke et al.
6,134,535 A 10/2000 Belzberg
6,161,098 A 12/2000 Wallman
6,195,647 B1 2/2001 Martyn et al.
6,260,025 B1 7/2001 Silverman et al.
6,272,474 B1 8/2001 Garcia
6,278,982 B1 8/2001 Korhammer et al.
6,282,521 B1 8/2001 Howorka
6,408,282 B1 6/2002 Buist
6,516,303 B1 2/2003 Wallman
6,697,099 B2 2/2004 Smith et al.
6,766,304 B2 7/2004 Kemp, II et al.
6,772,132 B1 8/2004 Kemp, II et al.
6,826,553 B1 11/2004 DaCosta et al.
6,839,686 B1 1/2005 Galant
6,876,981 B1 4/2005 Berckmans
6,938,011 B1 8/2005 Kemp, II et al.
6,993,504 B1 1/2006 Friesen et al.
7,124,424 B2 10/2006 Gordon et al.
7,127,424 B2 10/2006 Kemp, II et al.
7,155,410 B1 12/2006 Woodmansey et al.
7,181,424 B1 2/2007 Ketchum et al.
7,181,425 B1 2/2007 Cha
7,209,896 B1 4/2007 Serkin et al.
7,212,999 B2 5/2007 Friesen et al.
7,228,289 B2 6/2007 Brumfield et al.
7,243,083 B2 7/2007 Burns et al.
7,389,258 B2 6/2008 Brumfield et al.
7,389,268 B1 6/2008 Kemp, II et al.
7,418,422 B2 8/2008 Burns
7,426,491 B1 9/2008 Singer et al.
7,437,325 B2 10/2008 Kemp, II et al.
7,447,655 B2 11/2008 Brumfield et al.
7,461,023 B1 12/2008 Helweg
7,509,276 B2 3/2009 Brumfield et al.
7,512,561 B2 3/2009 Burns
7,523,064 B2 4/2009 Burns et al.
7,546,550 B1 * 6/2009 Buck .................... G06F 3/0482 715/834
7,558,754 B1 7/2009 Singer et al.
7,562,038 B1 7/2009 Brumfield et al.
7,567,929 B2 7/2009 Kemp, II et al.
7,571,134 B1 * 8/2009 Burns .................... G06Q 40/06 705/37
7,577,602 B2 8/2009 Singer
7,577,607 B2 * 8/2009 Singer .................... G06Q 20/10 705/37
7,590,578 B2 9/2009 Burns et al.
7,590,587 B2 9/2009 Duquette
7,593,887 B2 9/2009 Duquette
7,620,587 B2 11/2009 Duquette
7,624,064 B2 * 11/2009 Rosenthal .............. G06Q 40/04 705/37
7,624,066 B2 11/2009 Janowski et al.
7,680,724 B2 3/2010 Kemp, II et al.
7,685,055 B2 3/2010 Brumfield et al.
7,702,566 B2 4/2010 Kemp, II et al.
7,702,568 B1 4/2010 Tanpoco
7,702,569 B1 4/2010 Tanpoco
7,702,571 B2 4/2010 Janowski et al.
7,707,086 B2 4/2010 Burns et al.
7,720,742 B1 5/2010 Mauro et al.
7,783,556 B1 * 8/2010 Singer .................... G06Q 40/04 705/37
7,792,736 B2 9/2010 Wasendorf, Sr.
7,797,226 B2 9/2010 Ram et al.
7,818,247 B2 10/2010 Kemp, II et al.
7,844,532 B2 11/2010 Singer
7,870,059 B2 1/2011 Shapiro et al.
7,870,062 B2 1/2011 Waelbroeck et al.
7,870,064 B2 1/2011 Wasendorf, Sr.
7,890,414 B2 2/2011 Brumfield et al.
7,904,376 B2 * 3/2011 Shapiro .................. G06Q 40/04 705/37
7,917,426 B1 3/2011 Singer et al.
8,060,434 B1 11/2011 Mauro et al.
8,073,761 B2 12/2011 Bjornson et al.
8,108,291 B1 1/2012 Strauss et al.
8,150,760 B2 4/2012 Duquette
8,150,761 B2 4/2012 Duquette
8,190,501 B2 5/2012 Kemp, II et al.
8,195,554 B2 6/2012 Singer
8,229,837 B2 7/2012 Duquette
8,429,062 B2 4/2013 Singer
8,510,206 B2 * 8/2013 Faier ...................... G06Q 40/04 705/37
8,612,333 B2 12/2013 Kemp, II et al.
8,660,934 B2 * 2/2014 Buck ...................... G06Q 40/04 705/37
8,682,777 B1 * 3/2014 Epstein .................. G06Q 40/04 705/35
8,688,568 B2 4/2014 Faier
8,738,497 B1 5/2014 Schluetter et al.
8,744,950 B2 6/2014 Singer
8,768,816 B2 7/2014 Brumfield et al.
8,914,305 B2 * 12/2014 Buck ...................... G06Q 40/04 705/37
9,619,839 B2 * 4/2017 Crist ...................... G06Q 40/04
9,727,917 B2 * 8/2017 West ...................... G06Q 40/00
9,767,515 B2 * 9/2017 Buck ...................... G06Q 40/04
9,811,859 B2 * 11/2017 Kemp, II ............... G06Q 40/04
2001/0037284 A1 11/2001 Finkelstein et al.
2002/0023038 A1 2/2002 Fritsch et al.
2002/0035534 A1 3/2002 Buist et al.
2002/0046146 A1 4/2002 Otero et al.
2002/0046149 A1 4/2002 Otero et al.
2002/0046151 A1 4/2002 Otero et al.
2002/0049661 A1 4/2002 Otero et al.
2002/0052816 A1 5/2002 Clenaghan et al.
2002/0055899 A1 5/2002 Williams
2002/0059129 A1 5/2002 Kemp et al.
2002/0073017 A1 6/2002 Robertson
2002/0091611 A1 7/2002 Minton
2002/0099644 A1 * 7/2002 Kemp, II ........... G06Q 30/0275 705/37
2002/0120546 A1 * 8/2002 Zajac ..................... G06Q 40/04 705/37
2002/0120547 A1 * 8/2002 Zajac ..................... G06Q 40/04 705/37
2002/0120551 A1 8/2002 Jones

(56) References Cited

U.S. PATENT DOCUMENTS

2002/0138401 A1 9/2002 Allen et al.
2002/0156714 A1 10/2002 Gatto
2002/0178096 A1 11/2002 Marshall
2002/0184237 A1 12/2002 McFeely
2003/0004852 A1 1/2003 Burns
2003/0004853 A1 1/2003 Ram et al.
2003/0009411 A1 1/2003 Ram et al.
2003/0023536 A1 1/2003 Hollerman et al.
2003/0023542 A1 1/2003 Kemp, II et al.
2003/0041000 A1* 2/2003 Zajac .................... G06Q 40/04 705/37
2003/0065601 A1 4/2003 Gatto
2003/0065608 A1 4/2003 Cutler
2003/0069834 A1 4/2003 Cutler
2003/0126065 A1 7/2003 Eng et al.
2003/0236737 A1 12/2003 Kemp, II et al.
2004/0093300 A1* 5/2004 Burns .................... G06Q 40/06 705/37
2004/0103054 A1* 5/2004 Singer .................... G06Q 20/10 705/37
2004/0117292 A1 6/2004 Brumfield et al.
2004/0193524 A1 9/2004 Almeida et al.
2005/0075965 A1 4/2005 Cutler
2005/0262003 A1 11/2005 Brumfield et al.
2006/0015436 A1* 1/2006 Burns .................... G06Q 40/04 705/37
2006/0020538 A1 1/2006 Ram et al.
2006/0155626 A1* 7/2006 Wigzell ................. G06Q 40/00 705/35
2006/0167781 A1 7/2006 Kemp, II et al.
2006/0195387 A1 8/2006 Kemp, II et al.
2006/0195389 A1 8/2006 Kemp, II et al.
2006/0235786 A1 10/2006 Disalvo
2006/0259382 A1 11/2006 Kemp, II et al.
2006/0259383 A1 11/2006 Kemp, II et al.
2006/0259384 A1 11/2006 Schluetter et al.
2006/0259394 A1 11/2006 Cushing et al.
2006/0259398 A1 11/2006 Singer
2006/0259404 A1 11/2006 Brumfield et al.
2006/0265303 A1 11/2006 Kemp, II et al.
2006/0265304 A1 11/2006 Brumfield et al.
2006/0265305 A1 11/2006 Brumfield et al.
2006/0265316 A1 11/2006 Brumfield et al.
2006/0265317 A1 11/2006 Duquette
2006/0265320 A1 11/2006 Duquette
2006/0265321 A1 11/2006 Brumfield et al.
2006/0271467 A1 11/2006 Wasendorf, Sr.
2006/0271475 A1 11/2006 Brumfield et al.
2007/0005481 A1 1/2007 Kedia et al.
2007/0038549 A1* 2/2007 Janowski ............... G06Q 40/00 705/37
2007/0150401 A1* 6/2007 Brucato ................. G06Q 40/04 705/37
2008/0021809 A1 1/2008 Waelbroeck et al.
2008/0097893 A1* 4/2008 Walsky .............. G06Q 30/0601 705/37
2008/0140559 A1 6/2008 Ram et al.
2008/0313098 A1 12/2008 Janowski et al.
2009/0204548 A1 8/2009 Swearingen et al.
2009/0292633 A1 11/2009 Crist
2009/0292650 A1 11/2009 Duquette
2009/0292651 A1 11/2009 Duquette
2009/0292652 A1 11/2009 Duquette
2009/0307127 A1 12/2009 Burns et al.
2009/0319441 A1 12/2009 Duquette
2010/0010936 A1 1/2010 Singer
2010/0030684 A1 2/2010 Kemp, II et al.
2010/0138335 A1 6/2010 Kemp, II et al.
2010/0161512 A1 6/2010 Tanpoco
2010/0223203 A1* 9/2010 Smith .................... G06Q 40/00 705/36 R
2010/0268637 A1 10/2010 Burns
2010/0332379 A1 12/2010 Ram et al.
2010/0332380 A1 12/2010 Kemp, II et al.
2011/0035311 A1 2/2011 Singer
2011/0047095 A1 2/2011 Cushing et al.
2011/0060677 A1 3/2011 Almeida et al.
2011/0270732 A1* 11/2011 Ritter ..................... G06Q 40/04 705/37
2012/0005058 A1* 1/2012 Buck ...................... G06Q 40/04 705/37
2012/0022991 A1* 1/2012 Faier ...................... G06Q 40/04 705/37
2012/0209759 A1 8/2012 Singer
2012/0239545 A1 9/2012 Kemp, II et al.
2012/0303513 A1* 11/2012 Buck ...................... G06Q 40/00 705/37
2013/0275289 A1 10/2013 Singer
2014/0012727 A1 1/2014 Faier
2014/0081828 A1 3/2014 Kemp, II et al.
2014/0229360 A1 8/2014 Schluetter et al.
2014/0258079 A1 9/2014 Brumfield et al.
2014/0324665 A1 10/2014 Kemp, II et al.
2014/0330696 A1 11/2014 Faier
2014/0344132 A1 11/2014 Singer
2015/0012406 A1* 1/2015 Buck ...................... G06Q 40/04 705/37
2017/0345095 A1* 11/2017 Buck ...................... G06Q 40/04

FOREIGN PATENT DOCUMENTS

EP 269226 A1 2/1987
EP 259815 A2 7/1987
EP 1067471 A1 1/2001
JP H04-291621 A 10/1992
JP 6504152 A 5/1994
WO 1991/14231 A1 9/1991
WO 1992/12488 A1 7/1992
WO 1995/26005 A1 9/1995
WO 1998/49639 A1 11/1998
WO 1999/19821 A1 4/1999
WO 1999/30259 A1 6/1999
WO 1999/53424 A1 10/1999
WO 2000/52619 A1 9/2000
WO 2000/62187 A2 10/2000
WO 2000/62187 A3 10/2000
WO 2000/64176 A1 10/2000
WO 2000/65510 A1 11/2000
WO 2001/01077 A1 1/2001
WO 2001/16830 A1 3/2001
WO 2001/16852 A2 3/2001
WO 2001/16852 A8 3/2001
WO 2001/22315 A1 3/2001
WO 2001/22315 A3 3/2001
WO 2001/27843 A1 4/2001
WO 2001/54039 A1 7/2001
WO 2001/54039 A8 7/2001
WO 2001/63520 A1 8/2001
WO 2001/65403 A2 9/2001
WO 2001/71557 A1 9/2001
WO 2001/88808 A1 11/2001
WO 2002/15461 A2 2/2002
WO 2002/29686 A1 4/2002
WO 2002/33621 A1 4/2002
WO 2002/33623 A1 4/2002
WO 2002/33636 A1 4/2002
WO 2002/33637 A1 4/2002
WO 2002/48945 A1 6/2002
WO 2002/59815 A1 8/2002
WO 2002/69226 A1 9/2002
WO 2002/79940 A2 10/2002
WO 2002/93325 A1 11/2002
WO 2002/103601 A1 12/2002
WO 2003/17062 A1 2/2003
WO 2003/90032 A2 10/2003
WO 2003/90032 A3 10/2003

OTHER PUBLICATIONS

AURORA: The most technologically advanced trading system available today, Chicago Board of Trade, 1989, 11 pages.

(56) References Cited

OTHER PUBLICATIONS

Carbonnier, J. "Traderforce Unveils Silverlight Display," Inside Market Data, vol. 25, Iss. 11, Dec. 7, 2009, p. 6.
Cavaletti, C., 'Order Routing,' Futures Magazine, Feb. 1997, pp. 68-70.
Declaration of Brendan Bradley in Case No. 04 C 5312, Nov. 18, 2004, 27 pages.
English Translation of TSE "Publication 1," Sep. 1997.
English Translation of TSE "Publication 2," Aug. 1998.
English Translation of TSE "Publication 3," Jul. 31, 2000.
English Translation of TSE Document 1, Jan. 2000.
Expanding Futures and Options Trading Around the World, Around the Clock, GLOBEX, 1989, 48 pages.
Grummer, et al., 'Preliminary Feasibility Study,' Bermudex Ltd., Nov. 1980, 100 pages.
Hansell, S., 'The Computer that Ate Chicago,' Institutional Investor, Feb. 1989, 5 pages.
International Search Report of International Application No. PCT/US2003/012201, dated Sep. 21, 2003 (dated Oct. 21, 2003).
International Search Report of International Application No. PCT/US2003/037748, dated Apr. 17, 2006 (dated Jun. 28, 2006).
Kharouf, J. and Cavaletti, C. "A Trading Room with a View," Futures, vol. 27, Nov. 1998, pp. 66-71.
Market Watch Trading Screen, 2000, 1 page.
"MD Trader: The Most Sought-After Technology in Trading", Trading Technologies website, www.tradingtechnologies.com, 2006, pp. 1-2.
Memorandum Opinion and Order of Judge James B. Moran in Case No. 04 C 5312, Feb. 9, 2005, 22 pages.
Memorandum Opinion and Order Re: Preliminary Injunction [83], Feb. 9, 2005.
MLT Trade Vizion, http://www.trade-viziion.com/modules.php?name+Products (Jul. 29, 2004).
NASDAQ Workstation II User Guide, Guide to Enhancements for NASDAQ WorkStation II Software Release (Apr. 1998) as viewed on the Internet Archives at http://web.archive.org/web/20031208041112/nasdaqtrader.com/trader/tradingservices/productservices/userguides/nwliguide.pdf.
New York Mercantile Exchange (NYMEX) Access Documents, Feb. 28, 1992, 413 pages.
'One Click Trading Options,' Trading Technologies, Inc., 1998, one page.
Peake, et al., Appendix C of Preliminary Feasibility Study, 'The ABCs of Trading on a National Market System,' Bermudex Ltd., Sep. 1997,16 pages.
Peake, J.W., Appendix E of Preliminary Feasibility Study, 'The Last Fifteen Meters,' Bermudex Ltd., Jun. 15, 1997,18 pages.
REFCO English Translation of Tokyo Stock Exchange, Publication 1, 'Next-Generation Futures Options Trading System' (participants seminar materials), Sep. 1997.
REFCO English Translation of Tokyo Stock Exchange, Publication 2, 'Futures/Options Trading System Guidelines for Operating the Trading Terminals' (participants seminar materials), Aug. 1998.
REFCO English Translation Tokyo Stock Exchange, Publication 3, 'Tokyo Stock Exchange 50th Anniversary Book of Materials', Jul. 31, 2000.
Salcedo, Y. "Front ends and automated trading," Futures, vol. 34. Issue 15, Dec. 2005, pp. 56-57.
Salcedo, Y. "Tools for the advanced trader," Futures, vol. 36. Issue 12, Oct. 2007, pp. 54-55, 65.
Singapore Application No. 2004-06082-8, Corrected Search Report and Written Opinion issued by Australian Patent Office (dated Feb. 7, 2006) (8 pages).
Singapore Application No. 2004-06082-8, Search Report and Written Opinion issued by Australian Patent Office (dated Sep. 23, 2005) (10 pages).
'Sydney Futures Exchange Announces Plans to Join GLOBEX,' GLOBEX Report: An Update on the CME global electronic exchange, vol. II, No. 2, Feb. 10, 1989, 4 pages.
The Computer Assisted Trading System (CATS) Traders' Manual, Toronto Stock Exchange, Sep. 30, 1977, 142 pages.
Tokyo Stock Exchange, Document 1, 'Downloading the Terminal Program and Sending the Replacement for the Guidelines for Operating the Trading Terminals', Jan. 2000.
Tokyo Stock Exchange, Publication 1, 'Next-Generation Futures Options Trading System' (participants seminar materials), Sep. 1997.
Tokyo Stock Exchange, Publication 2, 'Futures/Options Trading System Guidelines for Operating the Trading Terminals', Aug. 1998.
Tokyo Stock Exchange, Publication 3, 'Tokyo Stock Exchange 50th Anniversary Book of Materials', Jul. 31, 2000.
Trading Screen, INTEX of Bermuda, 1984, one page.
Trading Screen, MEFF Exchange, 1990, one page.
Trading Screen, SWX Exchange, 1990, two pages.
Trading Screen, TIFFE Exchange, circa 1989-1990, one page.
Trading Technologies, "X_TRADER 6.0", Jun. 22, 2001. [Retrieved from the Internet on Feb. 3, 2010: http://web.archive.org/web20010622135748/http://www.tradingtechnologies.com/products/xtrader.htm].
"Trading Technologies Announces Release of X_ Trader(R) 7 Trading Software", PR Newswire [New York], Jan. 3, 2006, pp. 1-3.
USPTO Presentation, NASDAQ, Nov. 8, 2001, 15 pages.
Weber, B.W., 'Information Technology in the Major International Financial Markets,' Stem School of Business, New York University, Apr. 7, 1993, pp. 1-43.
X_Trader Product HTML Page [online], Trading Technologies International, Inc., Jun. 9, 2000. [Retrieved on Mar. 22, 2001] from the Internet: www.tradingtechnologies.com/products/xtrade_full.html.
U.S. Appl. No. 09/971,087 Jan. 12, 2006 Notice of Allowance.
U.S. Appl. No. 09/971,087 Mar. 10, 2003 Remarks submitted with RCE.
U.S. Appl. No. 09/971,087 Mar. 24, 2003 Notice of Allowance.
U.S. Appl. No. 09/971,087 Sep. 27, 2002 Amendment.
U.S. Appl. No. 10/125,894 Mar. 23, 2007 Office Action.
U.S. Appl. No. 10/304,248 Oct. 7, 2008 Office Action.
U.S. Appl. No. 10/304,248 Dec. 18, 2008 Advisory Action.
U.S. Appl. No. 10/304,248, filed Dec. 3, 2008 Response to Oct. 7, 2008 Office Action.
U.S. Appl. No. 10/304,248 Dec. 31, 2008 Amendment submitted with RCE.
U.S. Appl. No. 10/304,248 Feb. 6, 2008 Office Action.
U.S. Appl. No. 10/304,248 Mar. 19, 2009 Notice of Allowance and Examiner's Interview Summary.
U.S. Appl. No. 10/304,248 Mar. 6, 2009 Examiner's Interview Summary.
U.S. Appl. No. 10/304,248 May 19, 2009 Notice of Allowance and Examiner's Interview Summary.
U.S. Appl. No. 10/304,248, filed Jun. 6, 2008 Response to Feb. 6, 2008 Office Action.
U.S. Appl. No. 10/304,248 Jul. 13, 2009 Comments on Reasons for Allowance.
U.S. Appl. No. 11/389,018, Oct. 8, 2009 Amendment submitted under Rule 312.
U.S. Appl. No. 11/389,018 Dec. 15, 2008 Office Action.
U.S. Appl. No. 11/389,018, filed Mar. 25, 2010 Confirmation of Entry of Oct. 8, 2009 Rule 312 Amendment.
U.S. Appl. No. 11/389,018 Apr. 14, 2009 Amendment submitted with RCE.
U.S. Appl. No. 11/389,018 Mar. 27, 2008 Office Action.
U.S. Appl. No. 11/389,018, filed Jul. 28, 2008 Response to Mar. 27, 2008 Office Action.
U.S. Appl. No. 11/389,018 Jul. 9, 2009 Notice of Allowance.
U.S. Appl. No. 11/415,161 Jun. 16, 2009 Comments on Reasons for Allowance.
U.S. Appl. No. 11/415,161, filed Dec. 7, 2007 Response to Sep. 7, 2007 Office Action.
U.S. Appl. No. 11/415,161 Mar. 17, 2008 Office Action.
U.S. Appl. No. 11/415,161 Apr. 30, 2009 Notice of Allowance.
U.S. Appl. No. 11/415,161 Apr. 7, 2009 Notice of Allowance.

(56) References Cited

OTHER PUBLICATIONS

U.S. Appl. No. 11/415,161, filed Jul. 16, 2008 Response to Mar. 17, 2008 Office Action.
U.S. Appl. No. 11/415,161 Sep. 7, 2007 Office Action.
U.S. Appl. No. 11/415,966 Oct. 3, 2008 Office Action.
U.S. Appl. No. 11/415,966 Dec. 18, 2008 Advisory Action.
U.S. Appl. No. 11/415,966, filed Dec. 3, 2008 Response to Oct. 3, 2008 Office Action.
U.S. Appl. No. 11/415,966 Dec. 31, 2008 Amendment submitted with RCE.
U.S. Appl. No. 11/415,966 Feb. 6, 2008 Office Action.
U.S. Appl. No. 11/415,966, filed Jun. 6, 2008 Response to Feb. 6, 2008 Office Action.
U.S. Appl. No. 11/415,966 Mar. 9, 2009 Examiner's Interview Summary.
U.S. Appl. No. 11/415,966 Apr. 6, 2009 Notice of Allowance and Examiner's Interview Summary.
U.S. Appl. No. 11/415,966 May 29, 2009 Notice of Allowance and Examiner's Interview Summary.
U.S. Appl. No. 11/415,966 Jul. 14, 2009 Comments on Reasons for Allowance.
U.S. Appl. No. 11/417,871 Jun. 26, 2007 Office Action.
U.S. Appl. No. 12/502,408 Jul. 14, 2009 Preliminary Amendment.
U.S. Appl. No. 12/502,408 Jul. 16, 2010 Notice of Allowance and Examiner's Interview Summary.
U.S. Appl. No. 12/576,084 Oct. 8, 2009 Preliminary Amendment.
U.S. Appl. No. 12/907,087 Apr. 24, 2012 Amendment After Notice of Allowance (Rule 312).
U.S. Appl. No. 12/907,087 Jan. 27, 2012 Notice of Allowance and Examiner's Interview Summary.
U.S. Appl. No. 12/907,087 Oct. 19, 2010 Preliminary Amendment.
U.S. Appl. No. 13/454,586, filed Nov. 21, 2012 Response to Aug. 29, 2012 Non-Final Rejection.
U.S. Appl. No. 13/454,586 Dec. 26, 2012 Notice of Allowance.
U.S. Appl. No. 13/454,586 Aug. 29, 2012 Non-Final Rejection.
U.S. Appl. No. 13/850,874, filed Nov. 25, 2013 Response to Office Action dated Aug. 26, 2013.
U.S. Appl. No. 13/850,874 Dec. 23, 2013 Notice of Allowance.
U.S. Appl. No. 13/850,874 Jul. 3, 2013 Preliminary Amendment.
U.S. Appl. No. 13/850,874 Aug. 26, 2013 Office Action.
U.S. Appl. No. 14/220,222 Aug. 14, 2014 Preliminary Amendment.
U.S. Appl. No. 14/220,222 Mar. 16, 2016 Office Action.

* cited by examiner

200

220  210  230

| TO DEC 10 | | | | | |
|---|---|---|---|---|---|
| 11:25:15 | E/W | BidQ | Prc | AskQ | LTQ |
| -25 | | | 107100 | 17 | |
| 956224 | | | 107075 | 24 | |
| 0 | | | 107050 | 17 | |
| 1 | | | 107025 | 42 | |
| 1    5 | | | 107000 | 12 | |
| 10   20 | | | 106975 | 23 | |
| 50   100 | | | 106950 | 68 | |
| CLR | | | 106925 | 47 | |
| 1 | | | 106900 | 125 | 42 |
| SL   SM | | | 106875 | | |
| | | 123 | 106875 | | |
| | | 67 | 106850 | | |
| Del All | | 111 | 106825 | | |
| Delete 0 | | 24 | 106800 | | |
| Delete 0 | | 14 | 106775 | | |
| | | 26 | 106750 | | |
| | | 95 | 106725 | | |
| | | 62 | 106700 | | |
| | | 24 | 106675 | | |

Figure 2B:
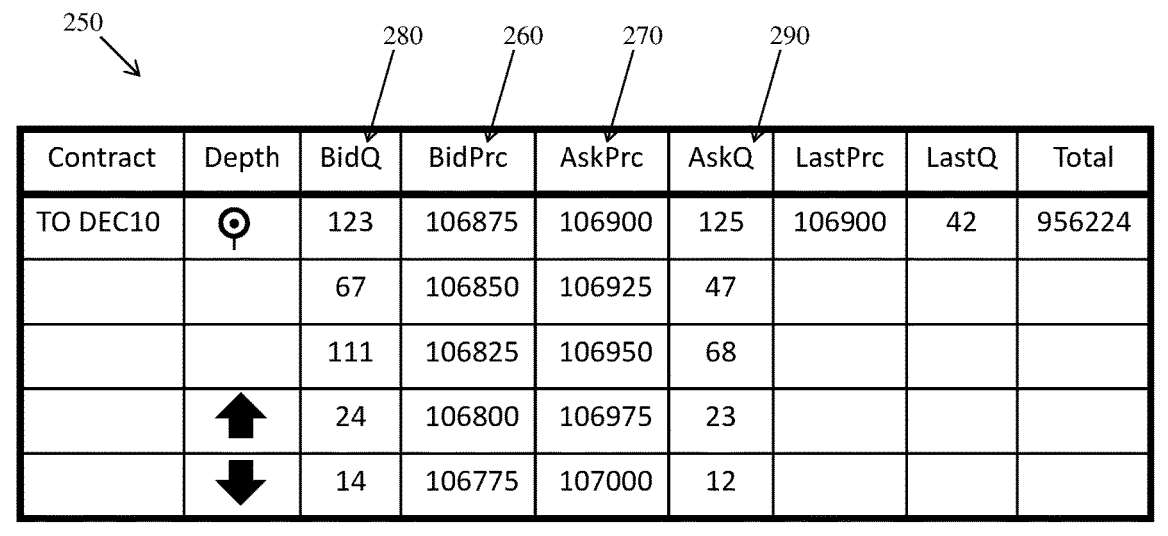

| Contract | Depth | BidQ | BidPrc | AskPrc | AskQ | LastPrc | LastQ | Total |
|---|---|---|---|---|---|---|---|---|
| TO DEC10 | ⊙ | 123 | 106875 | 106900 | 125 | 106900 | 42 | 956224 |
| | | 67 | 106850 | 106925 | 47 | | | |
| | | 111 | 106825 | 106950 | 68 | | | |
| | ↑ | 24 | 106800 | 106975 | 23 | | | |
| | ↓ | 14 | 106775 | 107000 | 12 | | | |

| TO DEC 10 | | | | | |
|---|---|---|---|---|---|
| 11:25:15 | E/W | BidQ | Prc | AskQ | LTQ |
| -25 | | | 107100 | 17 | |
| 956224 | | | 107075 | 24 | |
| 0 | | | 107050 | 17 | |
| 1 | | | 107025 | 42 | |
| 1  5 | | | 107000 | 12 | |
| 10  20 | | | 106975 | 23 | |
| 50  100 | | | 106950 | 68 | |
| CLR | | | 106925 | 47 | |
| 1 | | | 106900 | 125 | 42 |
| SL  SM | | 123 | 106875 | | |
| | | 67 | 106850 | | |
| Del All | | 111 | 106825 | | |
| Delete 0 | | 24 | 106800 | | |
| Delete 0 | | 14 | 106775 | | |
| | | 26 | 106750 | | |
| | | 95 | 106725 | | |
| | | 62 | 106700 | | |
| | | 24 | 106675 | | |
| | | | ... | | |

300

| TO DEC 10 | | | | | |
|---|---|---|---|---|---|
| 11:25:15 | E/W | BidQ | Prc | AskQ | LTQ |
| -25 | | | 107700 | 90 | |
| 956224 | | | 107600 | 70 | |
| 0 | | | 107500 | 71 | |
| 1 | | | 107400 | 94 | |
| 1   5 | | | 107300 | 95 | |
| 10  20 | | | 107200 | 97 | |
| 50  100 | | | 107100 | 100 | |
| CLR | | | 107000 | 150 | |
| 1 | | | 106900 | 125 | 42 |
| SL  SM | | 325 | 106800 | | |
| | | 197 | 106700 | | | ← 310
| Del All | | 124 | 106600 | | | ← 313
| Delete 0 | | 48 | 106500 | | | ← 311
| Delete 0 | | 84 | 106400 | | | ← 312
| | | 34 | 106300 | | | ← 314
| | | 48 | 106200 | | |
| | | 34 | 106100 | | |
| | | 18 | 106000 | | |

350

| Contract | Depth | BidQ | BidPrc | AskPrc | AskQ | LastPrc | LastQ | Total |
|---|---|---|---|---|---|---|---|---|
| TO DEC10 | ◉ | 325 | 106800 | 106900 | 125 | 106900 | 42 | 956224 |
|  |  | 197 | 106700 | 107000 | 150 |  |  |  |
|  |  | 124 | 106600 | 107100 | 100 |  |  |  |
|  | ↑ | 48 | 106500 | 107200 | 97 |  |  |  |
|  | ↓ | 84 | 106400 | 107300 | 95 |  |  |  |

400

| TO DEC 10 | | | | | |
|---|---|---|---|---|---|
| 11:25:15 | E/W | BidQ | Prc | AskQ | LTQ |
| -25 | | | 107700 | | 24 |
| 956224 | | | 107600 | | 22 |
| 0 | | | 107500 | | 21 |
| 1 | | | 107400 | | 23 |
| 1   5 | | | 107300 | 95 | |
| 10  20 | | | 107200 | 97 | |
| 50  100 | | | 107100 | 100 | |
| CLR | | | 107000 | 150 | |
| 1 | | | 106900 | 125 | 42 |
| | | 125 | 106900 | | |
| SL  SN | | 123 | 106875 | 800 | |
| | | 67 | 106850 | 700 | |
| Del All | | 111 | 106825 | 600 | |
| Delete 0 | | | | 500 | |
| Delete 0 | | | 84 | 106400 | |
| | | | 34 | 106300 | |
| | | | 48 | 106200 | |
| | | | 34 | 106100 | |
| | | | 18 | 106000 | |

500

| Contract | Depth | BidQ | BidPrc | AskPrc | AskQ | LastPrc | LastQ | Total |
|---|---|---|---|---|---|---|---|---|
| TO DEC10 | ⊙ | 325 | 106800 | 106900 | 125 | 106900 | 42 | 956224 |
| | | ~~197~~ 14 | ~~106700~~ 6775 | 107000 | 150 | | | |
| | | 26 | 6750 | 107100 | 100 | | | |
| | ↑ | 95 | 6725 | 107200 | 97 | | | |
| | ↓ | 62 | 6700 | 107300 | 95 | | | |

510

520

700

| TO DEC 10 | | | | | |
|---|---|---|---|---|---|
| 11:25:15 | E/W | BidQ | Prc | AskQ | LTQ |
| -25 | | | 107700 | 90 | |
| 956224 | | | 107600 | 70 | |
| 0 | | | 107500 | 71 | |
| 1 | | | 107400 | 94 | |
| 1    5 | | | 107300 | 95 | |
| 10   20 | | | 107200 | 97 | |
| 50   100 | | | 107100 | 100 | |
| CLR | | | 107000 | 150 | |
| 1 | | | 106900 | 125 | 42 |
| SL   SM | | 123 | 106875 | | |
| | | 67 | 106850 | | |
| Del All | | 111 | 106825 | | |
| Delete 0 | | 48 | 106500 | | |
| Delete 0 | | 84 | 106400 | | |
| | | 34 | 106300 | | |
| | | 48 | 106200 | | |
| | | 34 | 106100 | | |
| | | 18 | 106000 | | |

— 710
— 720

800

| Contract | Depth | BidQ | BidPrc | AskPrc | AskQ | LastPrc | LastQ | Total |
|---|---|---|---|---|---|---|---|---|
| TO DEC10 | | 123 | 106875 | 106900 | 125 | 106900 | 42 | 956224 |
| | | 67 | 106850 | 107000 | 150 | | | |
| | | 111 | 106825 | 107100 | 100 | | | |
| | | 24 | 106800 | 107200 | 97 | | | |
| | | 197 | 106700 | 107300 | 95 | | | |

| TO DEC 10 | | | | | |
|---|---|---|---|---|---|
| 11:25:15 | E/W | BidQ | Prc | AskQ | LTQ |
| -25 | | | 107700 | 90 | |
| 956224 | | | 107600 | 70 | |
| 0 | | | 107500 | 71 | |
| 1 | | | 107400 | 94 | |
| 1    5 | | | 107300 | 95 | |
| 10   20 | | | 107200 | 97 | |
| 50   100 | | | 107100 | 100 | |
| CLR | | | 107000 | 150 | |
| 1 | | | 106900 | 125 | 42 |
| SL   SM | B 1 / W 1 | | | | |
| | | 325 | 106800 | | |
| Del All | B 0 / W 3 | | | | |
| Delete 0 | B 0 / W 3 | | | | |
| Delete 7 | | 197 | 106700 | | |
| | | 124 | 106600 | | |
| | | 48 | 106500 | | |
| | | 84 | 106400 | | |
| | | 34 | 106300 | | |

CONSOLIDATED PRICE LEVEL EXPANSION

CROSS REFERENCE TO RELATED APPLICATIONS

The present application is a continuation of U.S. patent application Ser. No. 14/176,471, filed Feb. 10, 2014, now U.S. Pat. No. 9,773,249, which is a continuation of U.S. patent application Ser. No. 13/927,797, filed Jun. 26, 2013, now U.S. Pat. No. 8,688,568, which is a continuation of U.S. patent application Ser. No. 12/843,618, filed Jul. 26, 2010, now U.S. Pat. No. 8,510,206, entitled "Consolidated Price Level Expansion," the contents of each of which are fully incorporated herein by reference for all purposes.

BACKGROUND

The presently described technology is directed towards electronic trading systems. More particularly, certain embodiments are directed towards consolidated price level expansion in a trading interface.

An electronic trading system generally includes a client device in communication with an electronic exchange that may serve as a host for the client device. Typically, the electronic trading system provides for electronically matching orders to buy and sell tradeable objects to be traded. A tradeable object is an item that may be traded. Stocks, options, futures contracts, securities, and commodities are a few examples of tradeable objects.

The electronic exchange transmits market data to the client device. The market data may include, for example, price data, market depth data, last traded quantity data, data related to a market for the tradeable object, and/or combinations thereof. The client device receives market data from the electronic exchange.

In some electronic trading systems, a client device receives and processes market data without displaying the market data on a display device. However, in other electronic trading systems, the client device displays processed market data on a display device. The client device may include software that creates a trading screen. In general, a trading screen enables a user to participate in an electronic trading session. For example, a trading screen may enable a user to view market data, submit a trade order to the electronic exchange, obtain a market quote, monitor a position, and/or combinations thereof.

In some electronic trading systems, the client device sends trade orders to the electronic exchange. However, in other electronic trading systems, other devices, such as server side devices, are responsible for sending the one or more trade orders to the electronic exchange. Upon receiving a trade order, the electronic exchange enters the trade order into an exchange order book and attempts to match quantity of the trade order with quantity of one or more contra-side trade orders. By way of example, a sell order is contra-side to a buy order with the same price. Similarly, a buy order is contra-side to a sell order with the same price. Unmatched quantity of a trade order is held in the exchange order book until quantity of a trade order is matched by the electronic exchange. Unmatched quantity of a trade order may also be removed from the order book when a trade order is cancelled, either by the client device or electronic exchange. Upon matching quantity of the trade order, the electronic exchange may send a confirmation to the client device that the quantity of the trade order was matched.

A trading screen may display a number of price levels and the outstanding bid or ask quantities corresponding to those price levels. While the market may include outstanding bid and ask quantities at a multitude of different price levels, the trading screen may not be physically large enough (and/or a trader may not want to provide enough screen area) to accommodate displaying all of the different price levels and their outstanding bid or ask quantities. Thus, a trading screen typically displays a range of price levels (and the corresponding outstanding quantity) around the inside market.

However, displaying a small range of price levels around the inside market may provide a trader with a narrow view of the market. The trader may view the market depth around the inside market, but the trader may not be able to see the outstanding market depth at price levels further away from the inside market.

SUMMARY

The embodiments described herein include, but are not limited to, various devices, systems, methods, and computer program products.

Certain embodiments provide consolidated price level expansion. Data associated with the individual price levels represented by a consolidated price level is expanded and provided through an expanded consolidated price level interface. In certain embodiments, the expanded consolidated price level interface includes a pop-up interface. In certain embodiments, the expanded consolidated price level interface includes an in-line interface. In certain embodiments, an order may be entered using the expanded consolidated price level interface.

Certain embodiments provide a method including: displaying consolidated price level data for a consolidated price level, receiving a command, generating an expanded consolidated price level interface in response to the command, and displaying the expanded consolidated price level interface. The consolidated price level represents at least two price levels of a tradeable object. The consolidated price level data includes consolidated data for the at least two price levels. The expanded consolidated price level interface includes un-consolidated data associated with each of the at least two price levels of the consolidated price level.

Certain embodiments provide a method including: displaying consolidated price level data for a consolidated price level and displaying an expanded consolidated price level interface. The consolidated price level represents at least two price levels of a tradeable object. The consolidated price level data includes consolidated data for the at least two price levels. The expanded consolidated price level interface includes a subset of the un-consolidated data associated with each of the at least two price levels of the consolidated price level.

Other embodiments are described below. In addition, modifications may be made to the described embodiments without departing from the spirit or scope of the inventions.

BRIEF DESCRIPTION OF THE DRAWINGS

Example embodiments are described herein with reference to the following drawings.

FIGS. 2A-2B illustrate trading interfaces with un-consolidated price levels.

FIGS. 3A-3B illustrate trading interfaces with consolidated price levels in which certain embodiments may be employed.

FIGS. 4-9 illustrate trading interfaces according to certain embodiments.

Figure 1:
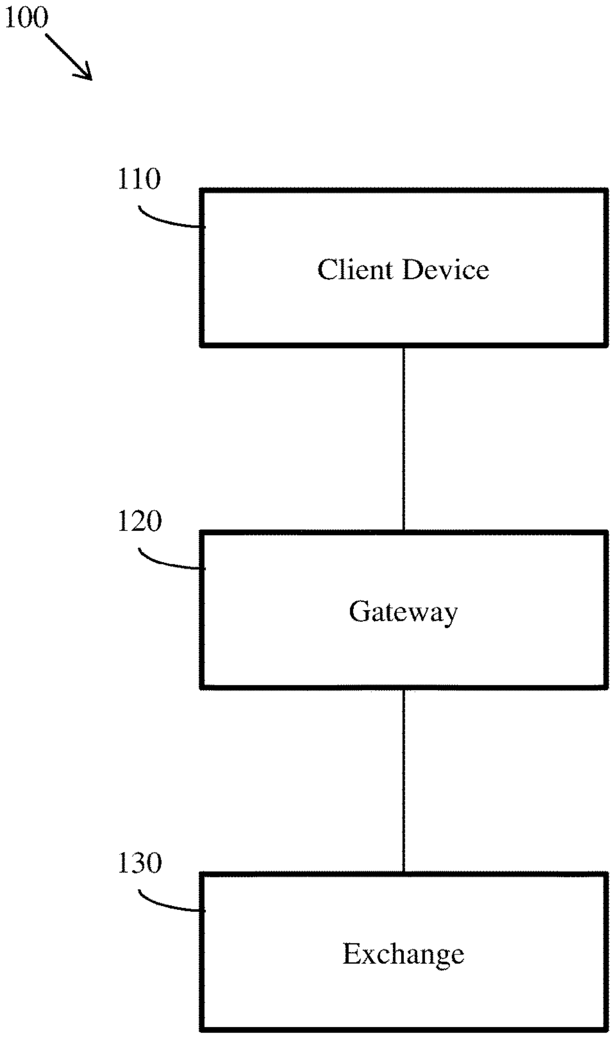
FIG. 1 illustrates a block diagram of an electronic trading system in which certain embodiments may be employed.

The foregoing summary, as well as the following detailed description, will be better understood when read in conjunction with the drawings which show certain embodiments. The drawings are for the purpose of illustrating certain embodiments, but it should be understood that the present inventions are not limited to the arrangements and instrumentality shown in the drawings.

DETAILED DESCRIPTION

I. Example Electronic Trading System

FIG. 1 illustrates a block diagram of an electronic trading system 100 in which certain embodiments may be employed. The system 100 includes a client device 110, a gateway 120, and an electronic exchange 130. The client device 110 is in communication with the gateway 120. The gateway 120 is in communication with the exchange 130.

As used herein, the phrase "in communication with" may include in direct communication and indirect communication through one or more intermediary components.

In operation, the client device 110 may send orders to buy or sell tradeable objects at the exchange 130. For example, a user may utilize the client device 110 to send the orders. The orders are sent through the gateway 120 to the exchange 130. In addition, market data is sent from the exchange 130 through the gateway 120 to the client device 110. The user may also utilize the client device 110 to monitor this market data and base a decision to send an order for a tradeable object on the market data.

A tradeable object is anything which can be traded with a quantity and/or a price. For example, financial products such as stocks, options, bonds, futures, currency, warrants, funds derivatives, securities, commodities, traded events, goods, and collections and/or combinations of these may be tradeable objects. A tradeable object may be "real" or "synthetic." A real tradeable object includes products that are listed by an exchange. A synthetic tradeable object includes products that are defined by the user and are not listed by an exchange. For example, a synthetic tradeable object may include a combination of real (or other synthetic) products such as a synthetic spread created by a trader utilizing a client device 110.

The client device 110 may include one or more electronic computing platforms such as a hand-held device, laptop, desktop computer, workstation with a single or multi-core processor, server with multiple processors, and/or cluster of computers, for example.

The client device 110 is generally owned, operated, controlled, programmed by, configured by, or otherwise used by a user. As used herein, the phrase "user" may include, but is not limited to, a human (for example, a trader) or an electronic trading device (for example, including a processor and memory or an algorithmic trading system). One or more users may be involved in the ownership, operation, control, programming, configuration, or other use, for example.

The client device 110 may include one or more trading applications. The trading application(s) may, for example, process market data by arranging and displaying the market data in trading and charting windows. This processing may be based on user preferences, for example. The trading application(s) may include an automated trading tool such as an automated spread trading tool, for example.

The client device 110 may include an electronic trading workstation, a portable trading device, an algorithmic trading or "black-box" system, an embedded trading system, and/or an automated trading tool, for example. For example, the client device 110 may be a computing system running a copy of X_TRADER®, an electronic trading platform provided by Trading Technologies International, Inc. of Chicago, Ill. As another example, the client device 110 may be a computing device running an automated trading tool such as Autospreader® and/or Autotrader™, also provided by Trading Technologies International, Inc.

The client device 110 is adapted to send orders to buy or sell a tradeable object. The client device 110 may also be adapted to cancel orders, change orders, and/or query an exchange, for example.

The orders sent by the client device 110 may be sent at the request of a user or automatically, for example. For example, a trader may utilize an electronic trading workstation to place an order for a particular tradeable object, manually providing various parameters for the order such as an order price and/or quantity. As another example, an automated trading tool may calculate one or more parameters for an order and automatically send the order. In some instances, an automated trading tool may prepare the order to be sent but not actually send it without confirmation from the user.

In certain embodiments, the client device 110 includes a user interface. The user interface may include one or more display devices for presenting a text-based or graphical interface of a trading application to a user, for example. For example, the display devices may include computer monitors, hand-held device displays, projectors, and/or televisions. The user interface may be used by the user to specify or review parameters for an order using a trading application. The user interface may include one or more input devices for receiving input from a user, for example. For example, the input devices may include a keyboard, trackball, two or three-button mouse, and/or touch screen. The user interface may include other devices for interacting with a user. For example, information may be aurally provided to a user through a speaker and/or received through a microphone.

In certain embodiments, a trading application may include one or more trading screens to enable a trader to interact with one or more markets. Trading screens may enable traders to obtain and view market information, set order entry parameters, enter and cancel orders, and/or monitor positions while implementing various trading strategies, for example. For example, a trading application may receive information (such as bid prices, bid quantities, ask prices, ask quantities, prices and quantities for past sales, and/or other market related information) from exchange 130 which, in turn, may be displayed with a user interface of client device 110. Based on the received information, the trading screen may display a range of price levels and corresponding bid and ask quantities for the price levels in regard to tradeable objects. In order to provide the trader with pertinent trading information, the trading screen may display a range of prices (and the corresponding bid and ask quantities) around the inside market. The information may be continuously or regularly provided to the trading application, which allows the trading application to update the trading screen with current market information. A trader may use the trading screen to place buy and sell orders for tradeable objects or to otherwise trade the tradeable objects based on the displayed information, for example.

Trading screens may display one or more trading tools. Trading tools are electronic tools that allow, assist with, and/or facilitate electronic trading. Exemplary trading tools include, but are not be limited to, charts, trading ladders, order entry tools, automated trading tools, automated spreading tools, risk management tools, order parameter tools, order entry systems, market grids, fill windows, and market order windows, combinations thereof, other electronic tools used for trading, preparing to trade, or managing trades.

In certain embodiments, the orders from the client device 110 are sent to the exchange 130 through the gateway 120. The client device 110 may communicate with the gateway 120 using a local area network, a wide area network, a virtual private network, a T1 line, a T3 line, an ISDN line, a point-of-presence, and/or the Internet, for example.

The gateway 120 is adapted to communicate with the client device 110 and the exchange 130. The gateway 120 facilitates communication between the client device 110 and the exchange 130. For example, the gateway 120 may receive orders from the client device 110 and transmit the orders to the exchange 130. As another example, the gateway 120 may receive market data from the exchange 130 and transmit the market data to the client device 110.

In certain embodiments, the gateway 120 performs processing on data communicated between the client device 110 and the exchange 130. For example, the gateway 120 may process an order received from the client device 110 into a data format acceptable by the exchange 130. Similarly, the gateway 120 may transform market data in an exchange-specific format received from the exchange 130 into a format understood by the client device 110. The processing of the gateway 120 may also include tracking orders from the client device 110 and updating the status of the order based on fill confirmations received from the exchange 130, for example. As another example, the gateway 120 may coalesce market data from the exchange 130 and provide it to the client device 120.

In certain embodiments, the gateway 120 provides services other than processing data communicated between the client device 110 and the exchange 130. For example, the gateway 120 may provide risk processing.

The gateway 120 may include one or more electronic computing platforms such as a hand-held device, laptop, desktop computer, workstation with a single or multi-core processor, server with multiple processors, and/or cluster of computers, for example.

The gateway 120 may include one or more gateway applications. The gateway application(s) may, for example, handle order processing and market data processing. This processing may be based on user preferences, for example.

In certain embodiments, the gateway 120 communicates with the exchange 130 using a local area network, a wide area network, a virtual private network, a T1 line, a T3 line, an ISDN line, a point-of-presence, and/or the Internet, for example.

In general, the exchange 130 may be owned, operated, controlled, or used by an exchange entity. Exemplary exchange entities include the London International Financial Futures and Options Exchange ("LIFFE"), the Chicago Board of Trade ("CBOT"), and the Chicago Mercantile Exchange ("CME"). The exchange 130 may be an electronic matching system, such as a computer, server, or other computing device, that is adapted to allow tradeable objects, for example, offered for trading by the exchange, to be bought and sold.

The exchange 130 is adapted to match orders to buy and sell tradeable objects. The tradeable objects may be listed for trading by the exchange 130. The orders may include orders received from the client device 110, for example. Orders may be received from the client device 110 through the gateway 120, for example. In addition, the orders may be received from other devices in communication with the exchange 130. That is, typically the exchange 130 will be in communication with a variety of other client devices (which may be similar to client device 110) that also provide orders to be matched.

The exchange 130 is adapted to provide market data. The market data may be provided to the client device 110, for example. The market data may be provided to the client device 110 through the gateway 120, for example. The market data may include data that represents the inside market, for example. The inside market is the lowest sell price (also referred to as the "best ask") and the highest buy price (also referred to as the "best bid") at a particular point in time. The market data may also include market depth. Market depth refers to the quantities available at the inside market and may also refer to quantities available at other prices away from the inside market. Thus, the inside market may be considered the first level of market depth. One tick away from the inside market may be considered the second level of market depth, for example. In certain embodiments, market depth is provided for all price levels. In certain embodiments, market depth is provided for less than all price levels. For example, market depth may be provided only for the first five price levels on either side of the inside market. The market data may also include information such as the last traded price (LTP), the last traded quantity (LTQ), and order fill information.

In certain embodiments, the system 100 includes more than one client device 110. For example, multiple client devices similar to the client device 110, discussed above, may be in communication with the gateway 120 to send orders to the exchange 130.

In certain embodiments, the system 100 includes more than one gateway 120. For example, multiple gateways similar to the gateway 120, discussed above, may be in communication with the client device 110 and the exchange 130. Such an arrangement may be used to provide redundancy should one gateway 120 fail, for example.

In certain embodiments, the system 100 includes more than one exchange 130. For example, the gateway 120 may be in communication with multiple exchanges similar to the exchange 130, discussed above. Such an arrangement may allow the client device 110 to trade at more than one exchange through the gateway 120, for example.

In certain embodiments, the system 100 includes more than one exchange 130 and more than one gateway 120. For example, multiple gateways similar to the gateway 120, discussed above, may be in communication with multiple exchanges similar to the exchange 130, discussed above. Each gateway may be in communication with one or more different exchanges, for example. Such an arrangement may allow one or more client devices 110 to trade at more than one exchange (and/or provide redundant connections to multiple exchanges), for example.

In certain embodiments, the client device 110 includes one or more computing devices or processing components. In other words, the functionality of the client device 110 may be performed by more than one computing device. For example, one computing device may generate orders to be sent to the exchange 130 while another computing device may provide a graphical user interface to a trader. In certain embodiments, the gateway 120 includes one or more computing devices or processing components. In other words, the functionality of the gateway 120 may be performed by more than one computing device. In certain embodiments, the exchange 130 includes one or more computing devices or processing components. In other words, the functionality of the exchange 130 may be performed by more than one computing device.

In certain embodiments, the gateway 120 is part of the client device 110. For example, the components of the gateway 120 may be part of the same computing platform as the client device 110. As another example, the functionality of the gateway 120 may be performed by components of the client device 110. In certain embodiments, the gateway 120 is not present. Such an arrangement may occur when the client device 110 does not need to utilize the gateway 120 to communicate with the exchange 130, for example. For example, if the client device 110 has been adapted to communicate directly with the exchange 130.

In certain embodiments, the gateway 120 is physically located at the same site as the client device 110. In certain embodiments, the gateway 120 is physically located at the same site as the exchange 130. In certain embodiments, the client device 110 is physically located at the same site as the exchange 130. In certain embodiments, the gateway 120 is physically located at a site separate from both the client device 110 and the exchange 130.

While not shown for the sake of clarity, in certain embodiments, the system 100 may include other devices that are specific to the communications architecture such as middleware, firewalls, hubs, switches, routers, exchange-specific communication equipment, modems, security managers, and/or encryption/decryption devices.

The components, elements, and/or functionality of the system 100 discussed above may be implemented alone or in combination in various forms in hardware, firmware, and/or as a set of instructions in software, for example. Certain embodiments may be provided as a set of instructions residing on a computer-readable medium, such as a memory, hard disk, CD-ROM, DVD, and/or EPROM, for execution on a general purpose computer or other processing device.

II. Price Consolidation

As noted above, displaying a small range of price levels around the inside market may provide a trader with a narrow view of the market. The trader may view the market depth around the inside market, but the trader may not be able to see the outstanding market depth at price levels further away from the inside market because, for example, the trading screen may not be physically large enough (and/or a trader may not want to provide enough screen area) to accommodate displaying all of the different price levels and their outstanding bid or ask quantities.

This problem may be accentuated depending on the "tick" size used by the market or the client software. A tick generally refers to the smallest tradeable price level graduation in the market. A market may use any measure for a tick. For example, a tick may represent a fraction of a dollar or another currency. As another example, a tick may represent a decimal portion of a dollar or another currency. When displaying smaller ticks, the trading screen displays an increasingly narrow view of the current market. For example, using a graduation of one cent, a trader may only be able to see price levels a few cents away from the inside market. The market, however, may have bids and asks outstanding over a range of several dollars away from the inside market, but the trader may not be able to see these other outstanding bids and asks due to the narrow range of price levels within the viewable area of the trading screen.

One technique to allow a trader to see a wider range of price levels is price consolidation. Exemplary trading screens that implement price consolidation are described in U.S. Pat. No. 7,127,424, entitled "Click Based Trading With Intuitive Grid Display of Market Depth and Price Consolidation," filed on Oct. 5, 2001; U.S. Pat. No. 7,389,268, entitled "Trading Tools for Electronic Trading," filed on Apr. 19, 2002; and U.S. Pat. No. 7,577,602, entitled "Method and Interface for Consolidating Price Levels on a Trading Screen," filed on Nov. 26, 2002, both of which are herein incorporated by reference in their entirety.

In price consolidation, two or more price levels may be combined into a single "consolidated" price level. That is, the consolidated price level represents two or more price levels. Data related to the individual price levels of the consolidated price level may be combined to obtain consolidated data for the consolidated price level. For example, the consolidated price level data may include a consolidated bid or ask quantity that may be the sum of the outstanding quantities of the un-consolidated price levels combined to form the consolidated price level. Using price consolidation, a trading screen may then display information from a greater number of price levels on the trading screen than it would be able to if it did not use price consolidation.

Figure 2A:
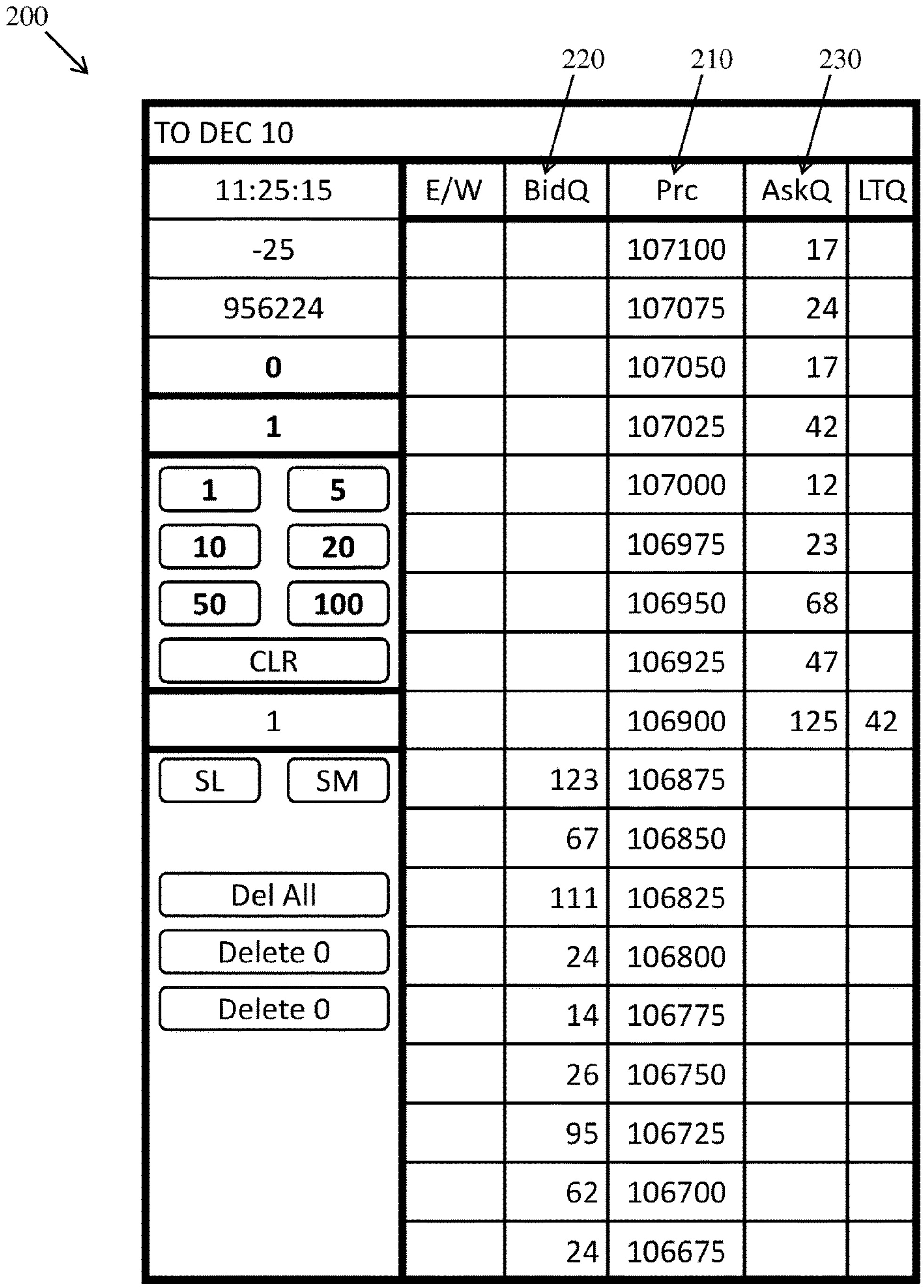

FIG. 2A illustrates a trading interface 200 with un-consolidated price levels. The trading interface 200 includes a price column 210, a bid quantity column 220, and an ask quantity column 230. The total quantity available to buy or sell at each price level along the price column 210 is shown in the respective bid column 220 and ask column 230.

FIG. 2B illustrates a trading interface 250 with un-consolidated price levels. The trading interface 250 includes a market grid with a bid price column 260, an ask price column 270, a bid quality column 280, and an ask quality column 290. The quantity available to buy at each price level along the bid price column 260 is shown in the bid quantity column 280. The quantity available to sell at teach price level along the ask price column 270 is shown in the ask quantity column 290.

Figure 2C:
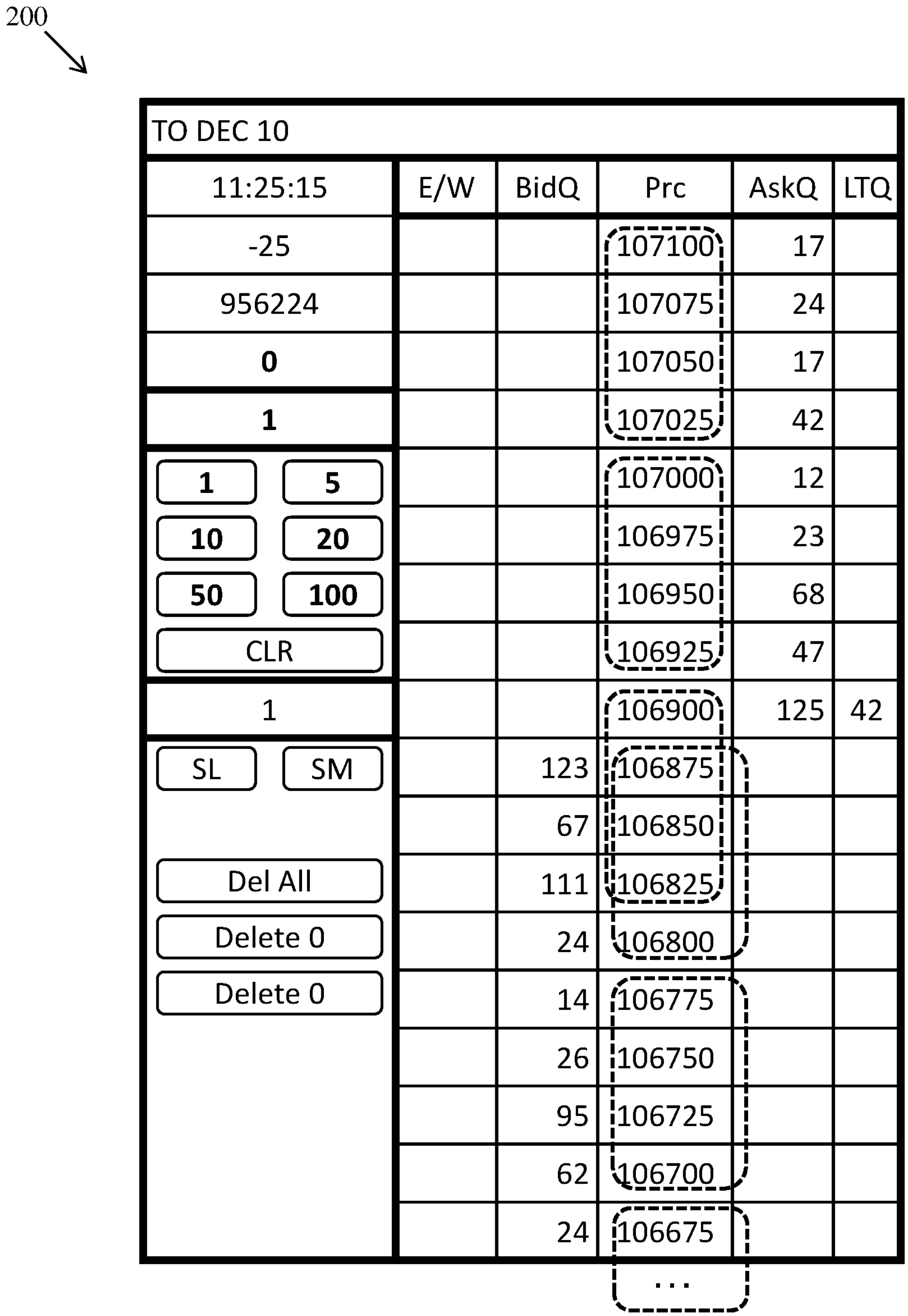
FIG. 2C illustrates the trading interface shown in FIG. 2A indicating the price levels to be grouped using a particular price consolidation technique.

FIG. 2C illustrates the trading interface 200 shown in FIG. 2A indicating the price levels to be grouped using a price consolidation technique similar to an embodiment discussed in U.S. Pat. No. 7,127,424, referenced and incorporated above. Note that other groupings and/or other price consolidation techniques may be utilized to achieve a price consolidated display, as understood in the art.

Figure 3A:
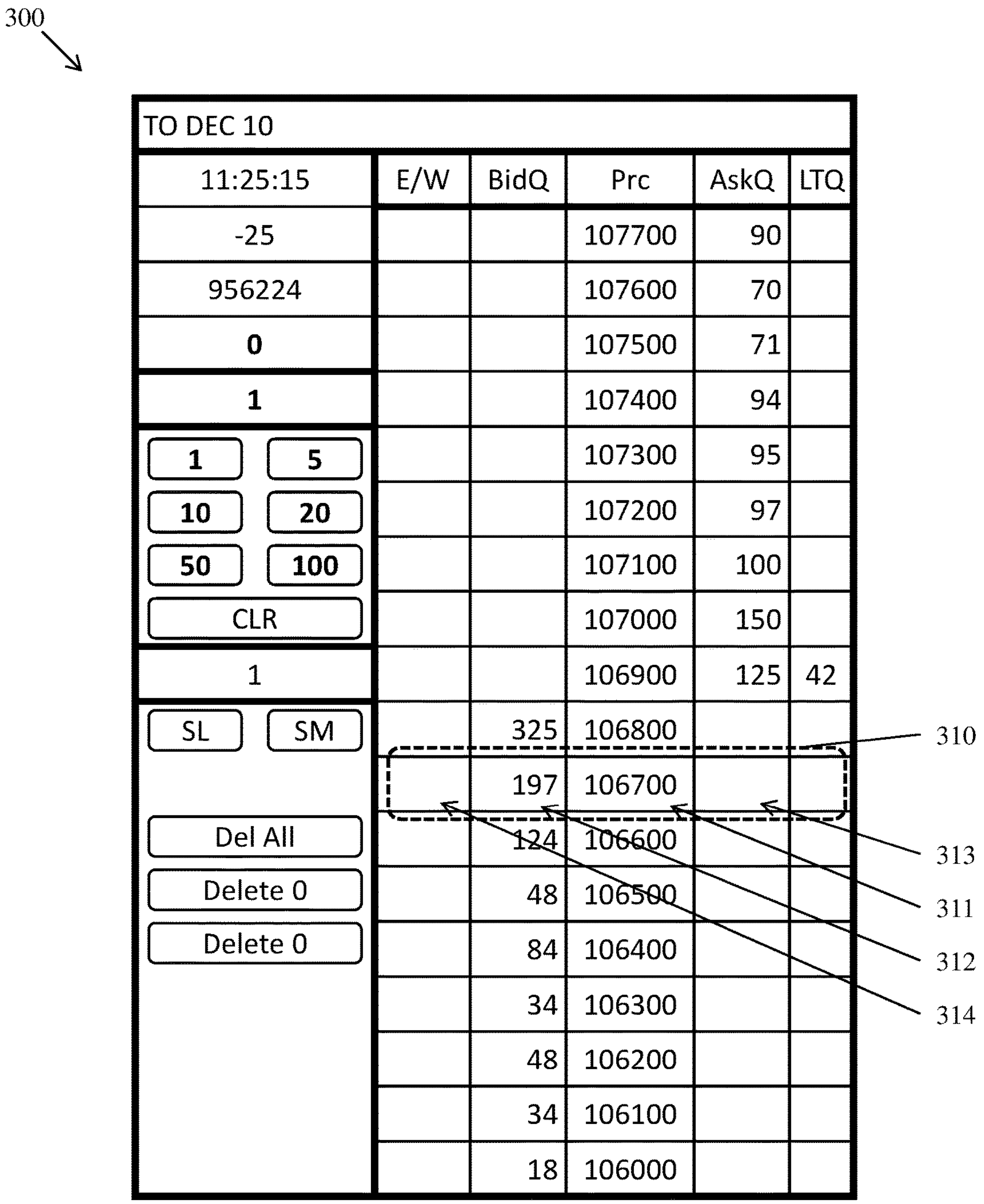

FIG. 3A illustrates a trading interface 300 with consolidated price levels in which certain embodiments may be employed. More particularly, the trading interface 300 corresponds to the trading interface 200 with price consolidation applied according to the groupings illustrated in FIG. 2C.

The trading interface 300 includes consolidated price level data 310 for consolidated price level 106700. The consolidated price level data 310 includes the consolidated price level 311 (106700), the consolidated bid quantity 312

(197), the consolidated ask quantity 313 (0), and the consolidated working order data 314 (no working orders are present in this example).

FIG. 3B illustrates a trading interface 350 with consolidated price levels in which certain embodiments may be employed. More particularly, the trading interface 350 corresponds to the trading interface 250 with price consolidation applied according to the groupings illustrated in FIG. 2C.

The trading interface 350 includes consolidated price level data that is different for the consolidated price levels based on whether they have consolidated bid quantity available or consolidated ask quantity available. In the former case, the consolidated price level data includes the consolidated bid quantity and the consolidated price level. In the latter case, the consolidated price level data includes the consolidated price level and the consolidated ask quantity.

III. Expansion of a Consolidated Price Level

Certain embodiments provide consolidated price level expansion. In a trading interface including a consolidated price level, data associated with the individual price levels represented by the consolidated price level is expanded and provided through an expanded consolidated price level interface.

In certain embodiments, the expanded consolidated price level interface includes a pop-up interface. The pop-up interface may be a window or graphical object, for example. The pop-up interface may be displayed such that it appears to overlay at least in part, be on top of, or be in front of some or all of a trading interface, for example. Alternatively, the pop-up interface may be displayed in a screen region that does not overlap a trading interface.

In certain embodiments, the expanded consolidated price level interface includes an in-line interface. The in-line interface extends or replaces the consolidated price level being expanded. The in-line interface is displayed such that it appears to be (or is) an integrated part of a trading interface.

An expanded consolidated price level interface is generated in response to a command from a user. The expanded consolidated price level interface is generated for one or more consolidated price levels. For example, the expanded consolidated price level interface may be generated for a price level associated with the command. As another example, the expanded consolidated price level interface may be generated for a consolidated price level associated with the location of a cursor and two adjacent consolidated price levels.

The expanded consolidated price level interface is generated based on some or all of the data associated with the price levels represented by the consolidated price level to be expanded, as discussed in more detail below.

The generated expanded consolidated price level interface is then displayed. As discussed above, the expanded consolidated price level interface may be a window or graphical object and may appear to be (or be) an integrated part of a trading interface.

The command may be an input from a user input device. For example, the input may include a key press, mouse movement, mouse click, or tap on a touch screen.

For example, the expanded consolidated price level interface may be generated and then displayed in response to a user pressing a key on a keyboard.

As another example, the expanded consolidated price level interface may be generated and then displayed in response to a user clicking a middle mouse button while a cursor is positioned in a region or area associated with a consolidated price level. The region or area associated with the consolidated price level may be include a price column, a quantity column and/or other columns associated with the consolidated price level, for example.

As another example, the expanded consolidated price level interface may be generated and then displayed automatically. For example, upon receiving a command to position a cursor in a region or area associated with a consolidated price level, the expanded consolidated price level interface may be generated and then displayed automatically. As another example, the consolidated price level for which the expanded consolidated price level interface is displayed may change automatically when the cursor is moved into a region or area associated with a different consolidated price level.

As another example, the expanded consolidated price level interface may be generated and then displayed in response to a cursor being positioned over a consolidated price level for a particular period of time. This may happen when the cursor hovers in the same, or approximately the same, location for the particular time period, for example. Alternatively, this may happen when the cursor remains within an area associated with a consolidated price level for the particular period of time (for example, over a consolidated price displayed in a price column). The particular period of time may be predetermined or configured by a user, for example. For example, the particular period of time may be predetermined to be 0.25 or 0.5 seconds. As another example, the particular period of time may be configured by a user to be a value between 0.1 and 5.0 seconds. As another example, the particular period of time may be at least 0.6 seconds.

As another example, the expanded consolidated price level interface may be generated and then displayed in response to a touch screen input. While a touch screen may not necessarily provide a cursor, a user may tap or otherwise provide an input to the touch screen in a region or area associated with the consolidated price level and, in response, the expanded consolidated price level interface may be displayed.

In certain embodiments, the expanded consolidated price level interface is displayed in relation to the location of a cursor (or the location of a touch screen input). For example, a pop-up interface may be displayed approximately adjacent to the cursor. As another example, the expanded consolidated price level interface may be displayed under the cursor.

In certain embodiments, the expanded consolidated price level interface is displayed in relation to the consolidated price level to which it corresponds. For example, in a pop-up interface, the expanded price level corresponding to the same price as the consolidated price level being expanded may be displayed approximately adjacent to each other. As another example, if a consolidated price level is identified as price level 1000 and includes price levels 995, 996, 997, 998, 999, and 1000, then the expanded consolidated price level interface may be displayed such that the expanded price level 1000 is approximately adjacent to the displayed consolidated price level 1000.

In certain embodiments, the expanded consolidated price level interface is displayed in place of the consolidated price level to which it corresponds. For example, an in-line interface may replace the consolidated price level being expanded in the trading interface display. As another example, if a consolidated price level is identified as price level 1000 and includes price levels 995, 996, 997, 998, 999, and 1000, then the expanded consolidated price level interface may be displayed such that the expanded price level 1000 is displayed in place of the consolidated price level 1000 (along with the other expanded price levels also being displayed).

In certain embodiments, the expanded consolidated price level interface is displayed at a predefined location on the screen. For example, the expanded consolidated price level interface may be displayed in a designated expanded consolidated price level display area in a trading interface. When a new consolidated price level is selected, the new expanded consolidated price levels may be displayed in that same display area. As another example, the predefined location may be a location separate from the trading interface, such as a separate, specially designated window.

In certain embodiments, more than one expanded consolidated price level interface is displayed. For example, a user may provide a command to display an expanded consolidated price level interface for more than one consolidated price level. In certain embodiments, when a command is received to display an expanded consolidated price level interface, any other displayed expanded consolidated price level interface is closed and/or removed from display. For example, when a user moves a cursor from a region associated with one consolidated price level into a region associated with another consolidated price level, a displayed expanded consolidated price level interface for the first consolidated price level may be hidden or closed and a new expanded consolidated price level interface may be displayed for the second consolidated price level.

In certain embodiments, the expanded consolidated price level interface includes all of the data related to the price levels included in the consolidated price level being expanded. For example, if a trading interface provides the following consolidated price level data: consolidated price level, consolidated bid and ask quantity data, and consolidated working order data, then the expanded consolidated price level interface would include the individual price levels along with the bid and ask quantity data and the working order data for each of the expanded price levels.

In certain embodiments, the expanded consolidated price level interface includes a subset of the data related to the price levels included in the consolidated price level being expanded. For example, the expanded consolidated price level interface may include one or more of the bid quantity data, ask quantity data, working order data, and the individual price levels. As another example, an expanded consolidated price level interface may include just the bid quantity data and the individual expanded price levels. As another example, an expanded consolidated price level interface may include just the bid and ask quantity data, without any working order data or the individual expanded price levels. As another example, an expanded consolidated price level interface may include working order data, the individual expanded price levels, and only the bid or ask quantity data if any non-zero values are available for any of the individual expanded price levels. As another example, an expanded consolidated price level interface may include alternative representations of the consolidated data, such as a shortened or abbreviated representation of the price level or quantity data.

In certain embodiments, the expanded consolidated price level interface includes one or more indicators to identify the displayed information as being for expanded consolidated price levels. For example, a border may be displayed around the expanded consolidated price level interface to visually offset it from other portions of a trading interface. The border may be a different thickness and/or color, for example. As another example, data displayed in the expanded consolidated price level interface may be displayed using different colors (or with different backgrounds colors, shading, and/or transparency) from other data displayed in a trading interface. Where the trading interface may display bid quantity data with a blue background and ask quantity data with a red background, the expanded consolidated price level interface may display the bid quantity data for the expanded consolidated price levels with a light blue background and the ask quantity data with a pink background, for example.

In certain embodiments, the expanded consolidated price level interface displays current data for the displayed expanded consolidated price levels. For example, the expanded consolidated price level interface may periodically update the bid and ask quantity data based on updated values that have been received. As another example, the expanded consolidated price level interface may reflect changes in working order data as updated values are received. In certain embodiments, the expanded consolidated price level interface displays a fixed snapshot of the data for the displayed expanded consolidated price levels. For example, while the trading interface may reflect changes in bid and ask quantity as updated values are received, the expanded consolidated price level interface may not update its displayed data.

In certain embodiments, a command may be received in order to maintain the display of the expanded consolidated price level interface so that it may be interacted with. For example, a user may hold down a key so that, when moving the cursor from a consolidated price level to the expanded consolidated price level interface, the expanded consolidated price level interface does not move, close, and/or stop being displayed as a consequence of the user moving the cursor to the expanded consolidated price level interface.

In certain embodiments, an order may be entered using the expanded consolidated price level interface. For example, an order may be placed by clicking on an expanded price level or in an expanded bid or ask quantity column. In certain embodiments, an order may be manipulated using the expanded consolidated price level interface. For example, an order's price may be changed by moving or dragging it from one expanded price level to another expanded price level (within the same expanded consolidated price level interface or an expanded consolidated price level interface for a different consolidated price level) or to another consolidated price level. As another example, an order may be cancelled (or the quantity changed) using the expanded consolidated price level interface.

Figure 4:
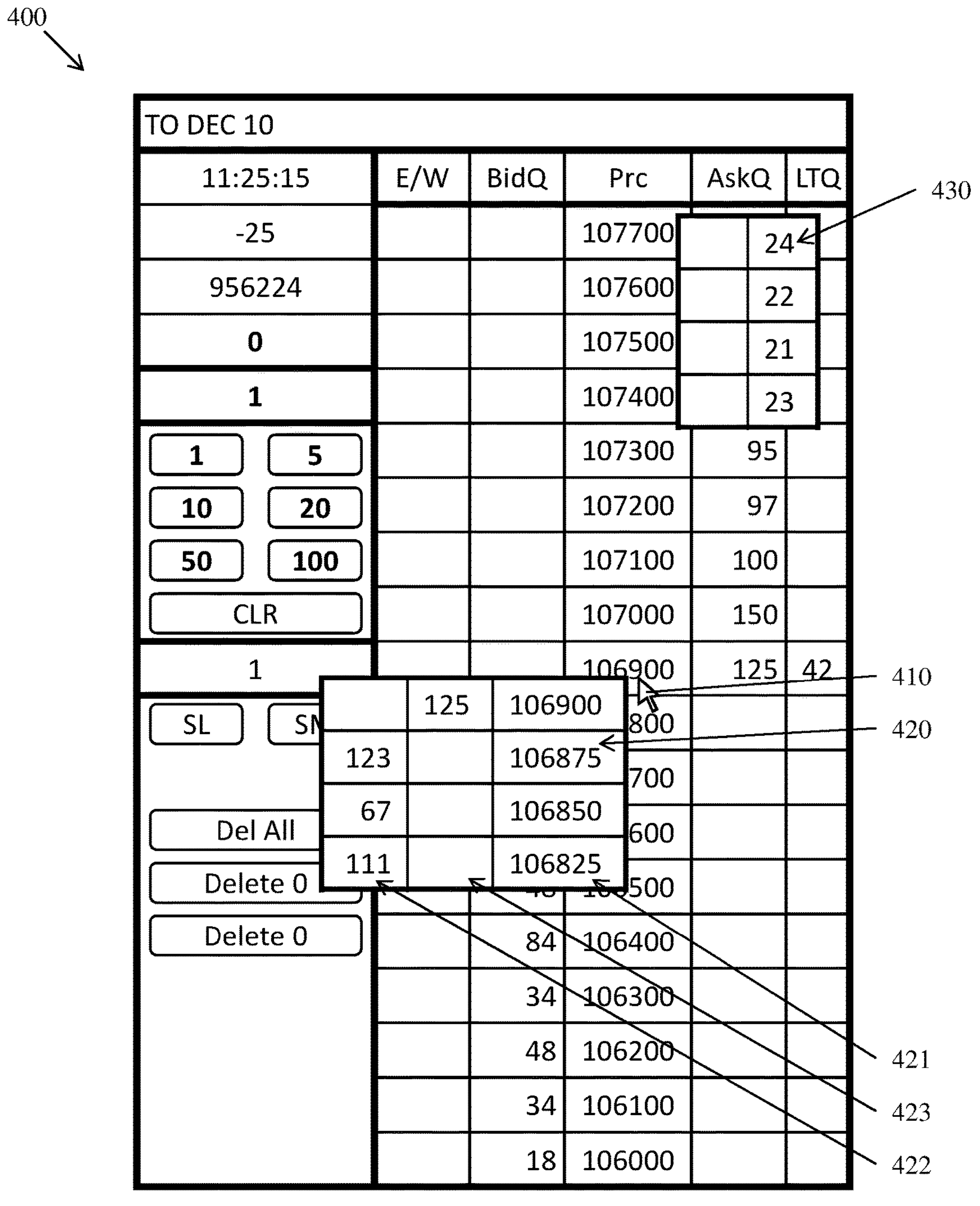

FIG. 4 illustrates a trading interface 400 according to certain embodiments. The trading interface 400 is similar to the trading interface 300 discussed above.

The trading interface 400 includes two expanded consolidated price level interfaces, a first pop-up interface 420 and a second pop-up interface 430. Cursor 410 is also illustrated.

The first pop-up interface 420 displays an expansion of a consolidated price level of the trading interface 400. In particular, as illustrated in FIG. 4, the first pop-up interface 420 displays four price levels 421 (106825, 106850, 106875, and 106900) included in consolidated price level 106900. In addition, the first pop-up interface 420 displays the corresponding expanded bid quantities 422 and ask quantities 423 at the expanded price levels 421. The first pop-up interface 420 is displayed in proximity to the cursor 410. The first pop-up interface 420 is also displayed with a thicker border to visually distinguish it from other portions of the trading interface 400.

The second pop-up interface 430 displays an expansion of another consolidated price level of the trading interface 400. In particular, as illustrated in FIG. 4, the second pop-up interface 430 displays data corresponding to four price levels (107625, 107650, 107675, and 107700) included in consolidated price level 107700. Note, however, that the actual price levels are not displayed in the second pop-up interface 430. Rather, the particular price levels are implicit, with the top row of the second pop-up interface 430 corresponding to expanded price level 107700 and approximately aligned with the consolidated price level 107700. The second pop-up interface 430 displays two columns corresponding to the bid and ask quantities at the expanded price levels. The second pop-up interface 430 is also displayed with a thicker border to visually distinguish it from other portions of the trading interface 400.

Figure 5:
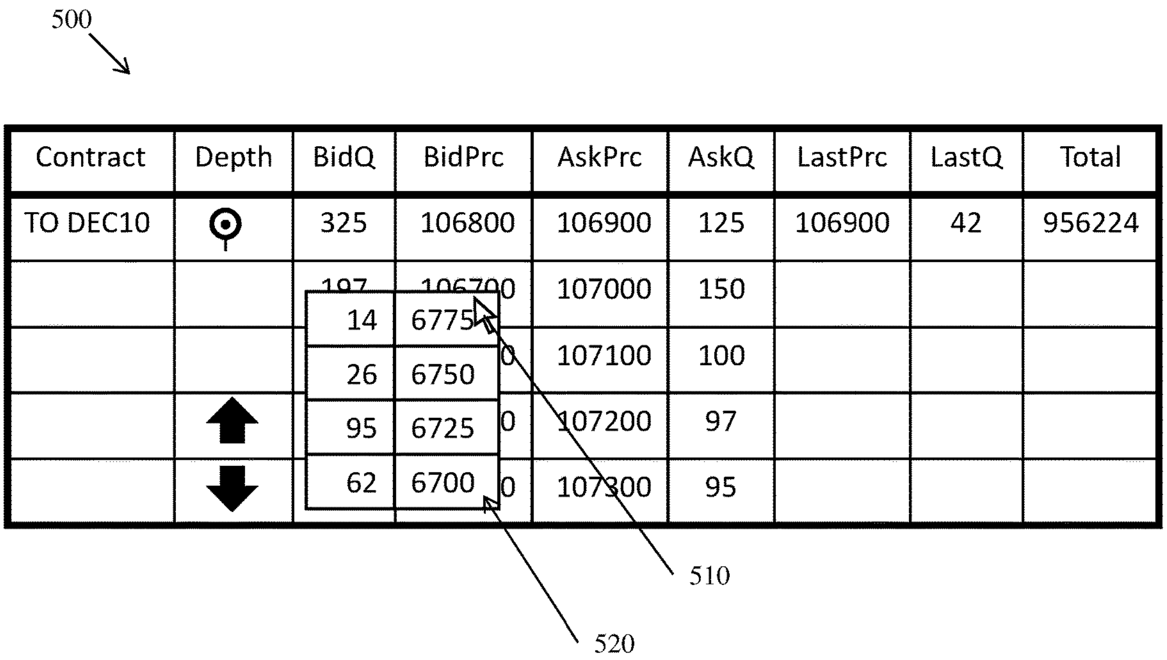

FIG. 5 illustrates a trading interface 500 according to certain embodiments. The trading interface 500 is similar to the trading interface 350 discussed above.

The trading interface 500 includes an expanded consolidated price level interface, pop-up interface 520. Cursor 510 is also illustrated.

The pop-up interface 520 displays an expansion of a consolidated price level of the trading interface 500. In particular, as illustrated in FIG. 5, the pop-up interface 520 displays four price levels (106700, 106725, 106750, and 106775) included in consolidated price level 106700. Note, however, that price levels are shown in an alternative representation, where the leading “10” digits are omitted. Such an alternative representation may allow the pop-up interface 520 to be smaller and obscure less of the trading interface 500, for example. In addition, the pop-up interface 520 displays the corresponding expanded bid quantities at the expanded price levels. The pop-up interface 520 is displayed “under” to the cursor 510.

Figure 6:
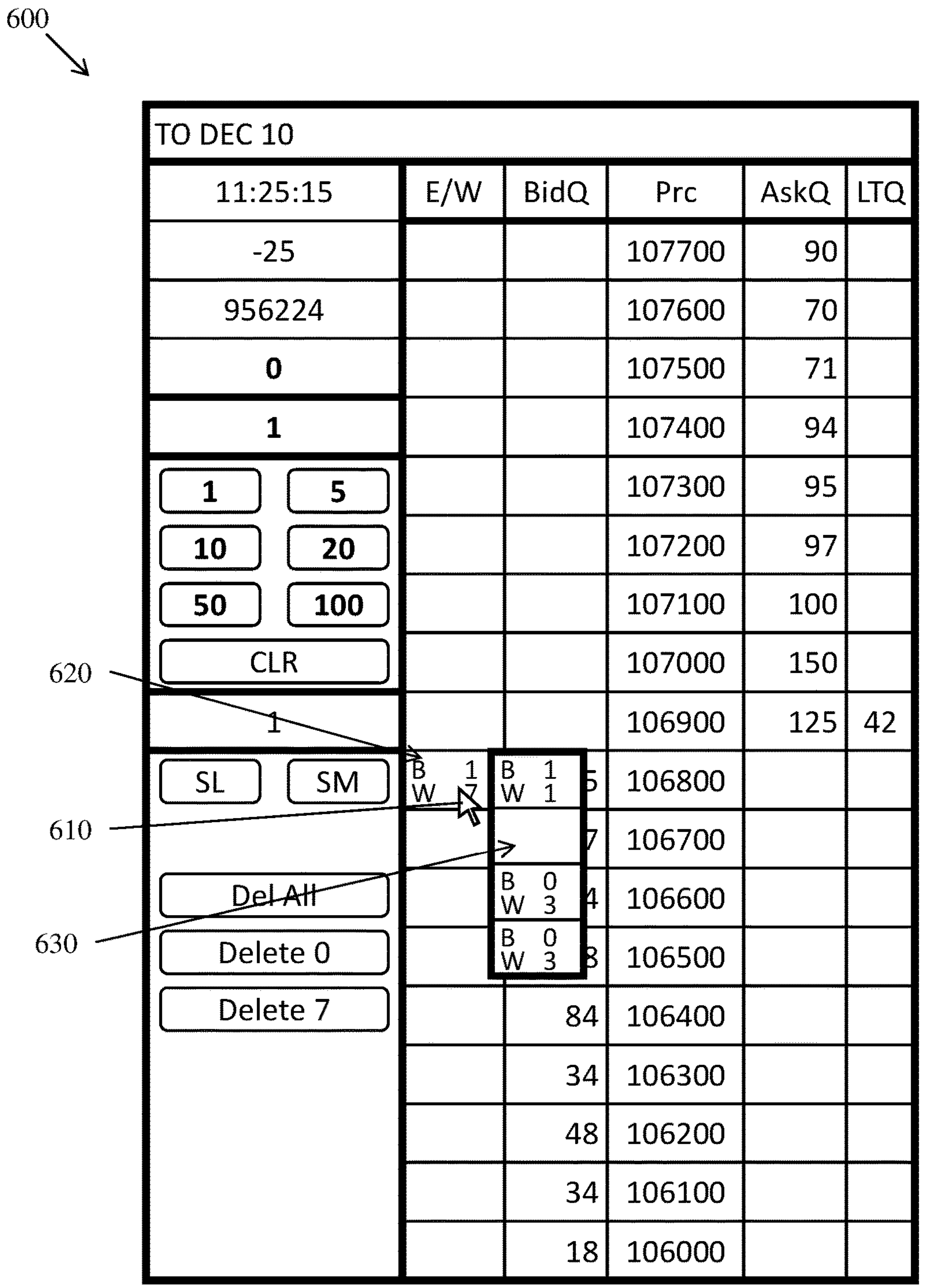

FIG. 6 illustrates a trading interface 600 according to certain embodiments. The trading interface 600 is similar to the trading interface 300 discussed above.

The trading interface 600 includes an expanded consolidated price level interface, pop-up interface 620. Cursor 610 is also illustrated along with a consolidated working order indicator 630. The consolidated working order indicator 630 represents consolidated working order data (a quantity of 7 working and 1 filled) for the consolidated price level 106800.

The pop-up interface 620 displays an expansion of a consolidated price level of the trading interface 600. In particular, as illustrated in FIG. 6, the pop-up interface 620 displays data corresponding to four price levels (106725, 106750, 106775, and 106800) included in consolidated price level 106800. Note, however, that the actual price levels are not displayed in the pop-up interface 620. Rather, the particular price levels are implicit, with the top row of the pop-up interface 620 corresponding to expanded price level 106800 and approximately aligned with the consolidated price level 106800. The pop-up interface 620 displays a single column expanding the working order data represented by the consolidated working order indicator 630 by showing working order indicators corresponding to the working orders entered at each respective price level of the consolidated price level 106800. Note that the second row from the top of the pop-up interface 620, corresponding to price level 106775, does not include a working order indicator because no working orders are entered at that price level. The pop-up interface 620 is displayed automatically when the cursor 610 is positioned over the consolidated working order indicator 630. The pop-up interface 620 is displayed with a thicker border to visually distinguish it from other portions of the trading interface 600.

Figure 7:
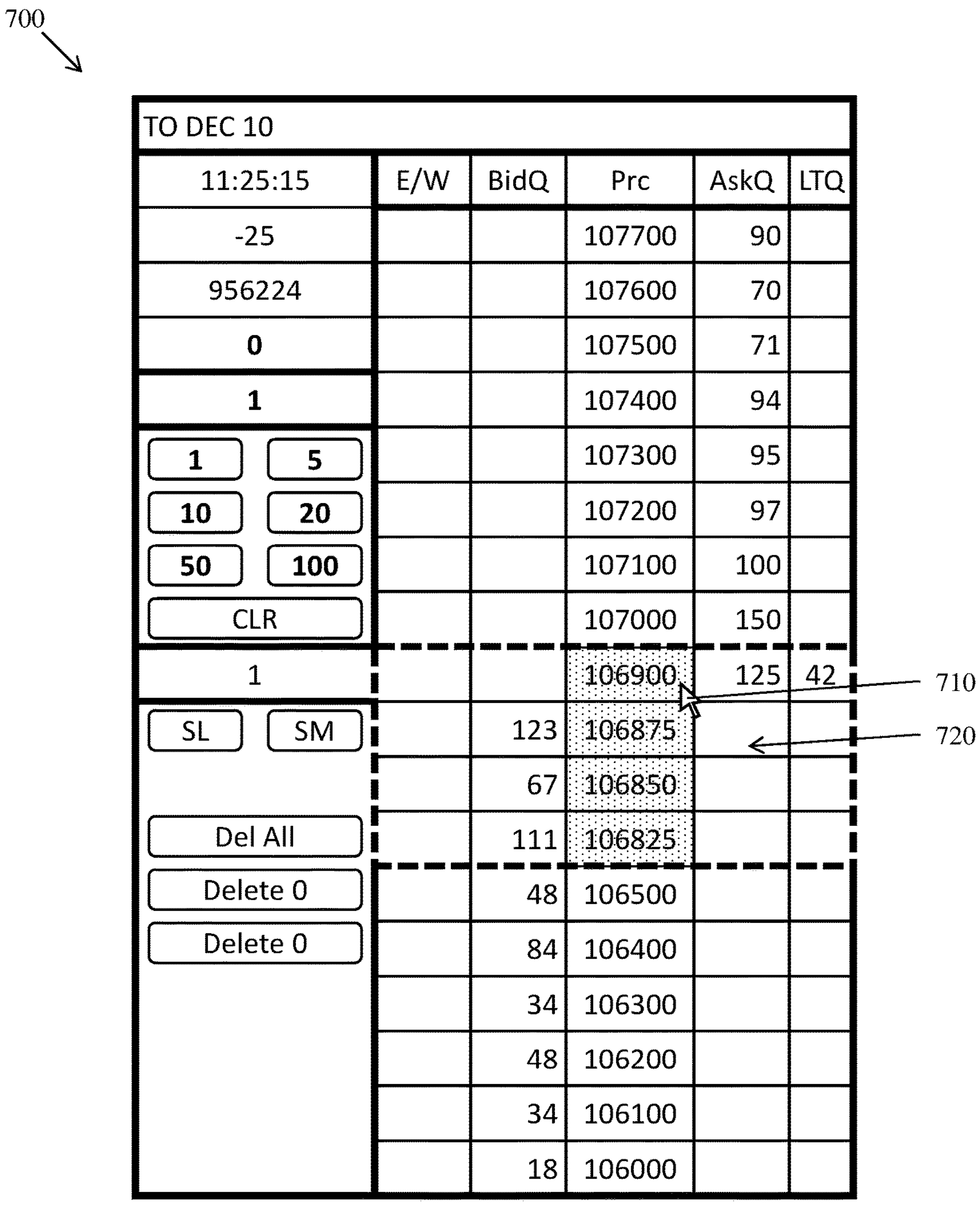

FIG. 7 illustrates a trading interface 700 according to certain embodiments. The trading interface 700 is similar to the trading interface 300 discussed above.

The trading interface 700 includes an expanded consolidated price level interface, in-line interface 720. Cursor 710 is also illustrated.

The inline-interface 720 displays an expansion of a consolidated price level of the trading interface 700. In particular, as illustrated in FIG. 7, the in-line interface 720 displays four price levels (106825, 106850, 106875, and 106900) included in consolidated price level 106900. In addition, the in-line interface 720 displays all of the consolidated data at the at the corresponding expanded price levels: bid and ask quantities, working order data (none are present in the illustrated case), and last traded price (“LTP”). The in-line interface 720 is displayed automatically when the cursor 710 is positioned over the consolidated price level 106900. Note that the in-line interface 720 displays the expanded price levels over the other consolidated price levels and does not shift the position of those consolidated price levels. The in-line interface 720 displays the expanded price levels with a different background color to distinguish them from the consolidated price levels. The in-line interface 720 is also displayed with a thicker and differently colored and styled border to visually distinguish it from other portions of the trading interface 700.

FIG. 8 illustrates a trading interface 800 according to certain embodiments. The trading interface 800 is similar to the trading interface 350 discussed above.

The trading interface 800 includes an expanded consolidated price level interface, in-line interface 820. Cursor 810 is also illustrated.

The inline-interface 820 displays an expansion of a consolidated price level of the trading interface 800. In particular, as illustrated in FIG. 8, the in-line interface 820 displays four price levels (106800, 106825, 106850, and 106875) included in consolidated price level 106800. In addition, the in-line interface 820 displays the corresponding expanded bid quantities at the expanded price levels. Because the consolidated price level 106800 would have been at the top row (as shown in FIG. 3B), when the in-line interface 820 was displayed, the expanded rows were inserted and the consolidated price levels were shifted down to make room. In addition, the cursor was repositioned to the expanded price level 106800 corresponding to the consolidated price level 106800. The in-line interface 820 displays the expanded data (price levels and bid quantity) with a different background color to distinguish them from the data associated with the consolidated price levels of the trading interface 800.

Figure 9:
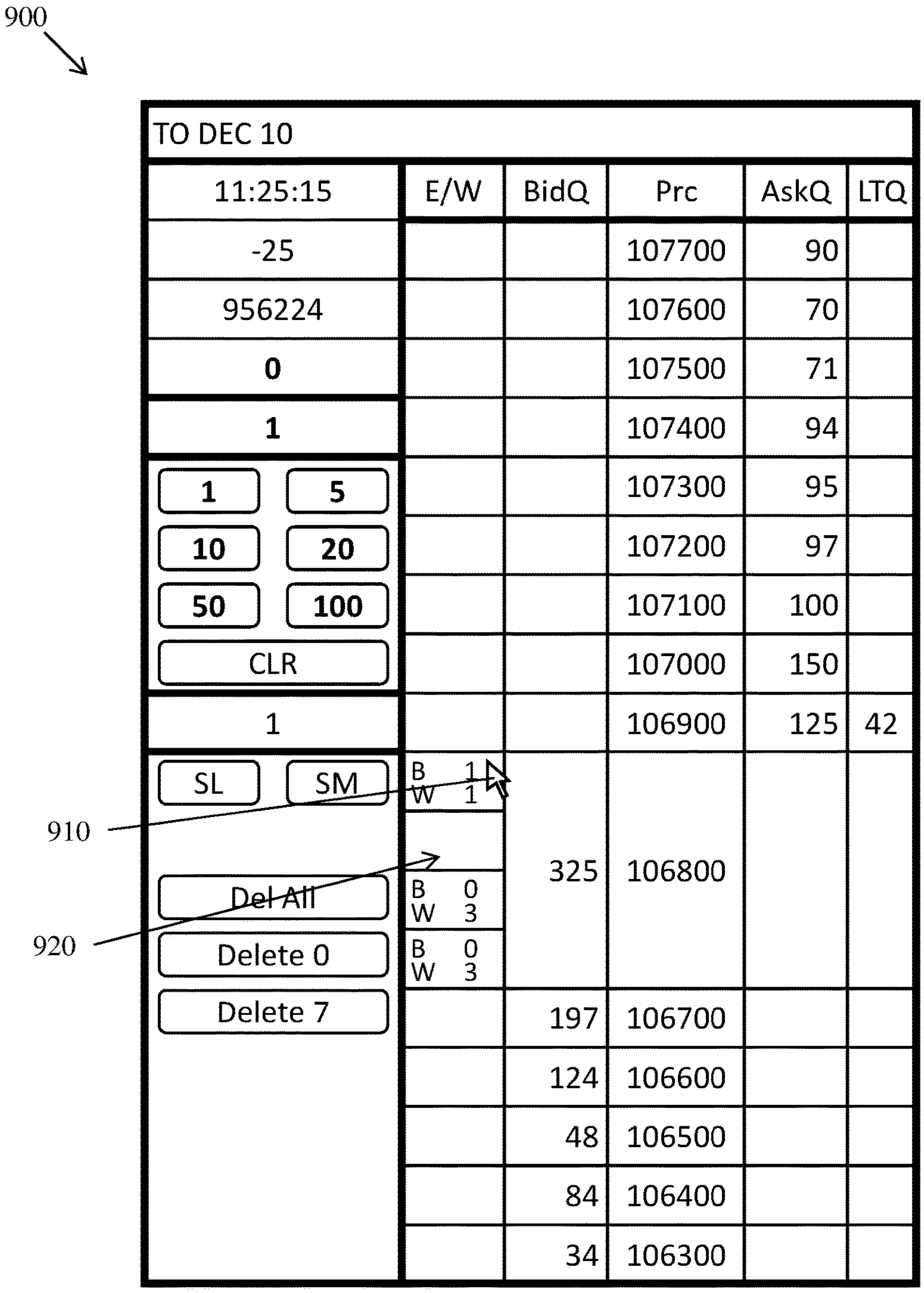

FIG. 9 illustrates a trading interface 900 according to certain embodiments. The trading interface 900 is similar to the trading interface 300 discussed above.

The trading interface 900 includes an expanded consolidated price level interface, in-line interface 920. Cursor 910 is also illustrated.

The inline-interface 920 displays an expansion of a consolidated price level of the trading interface 900. In particular, as illustrated in FIG. 9, the in-line interface 920 displays data corresponding to four price levels (106725, 106750, 106775, and 106800) included in consolidated price level 106800. Note, however, that the actual price levels are not displayed in the in-line interface 920. Rather, the particular price levels are implicit, with the top row of the in-line interface 920 corresponding to expanded price level 106800. The in-line interface 920 displays a single column expanding the working order data for the consolidated price level 106800 by showing working order indicators corresponding to the working orders entered at each respective price level of the consolidated price level 106800. Note that the second row from the top of the in-line interface 920, corresponding to price level 106775, does not include a working order indicator because no working orders are entered at that price level. The in-line interface 920 is displayed in response to a key press from a user to expand all consolidated working order data in the trading interface 900.

IV. Example Embodiments

Figure 10:
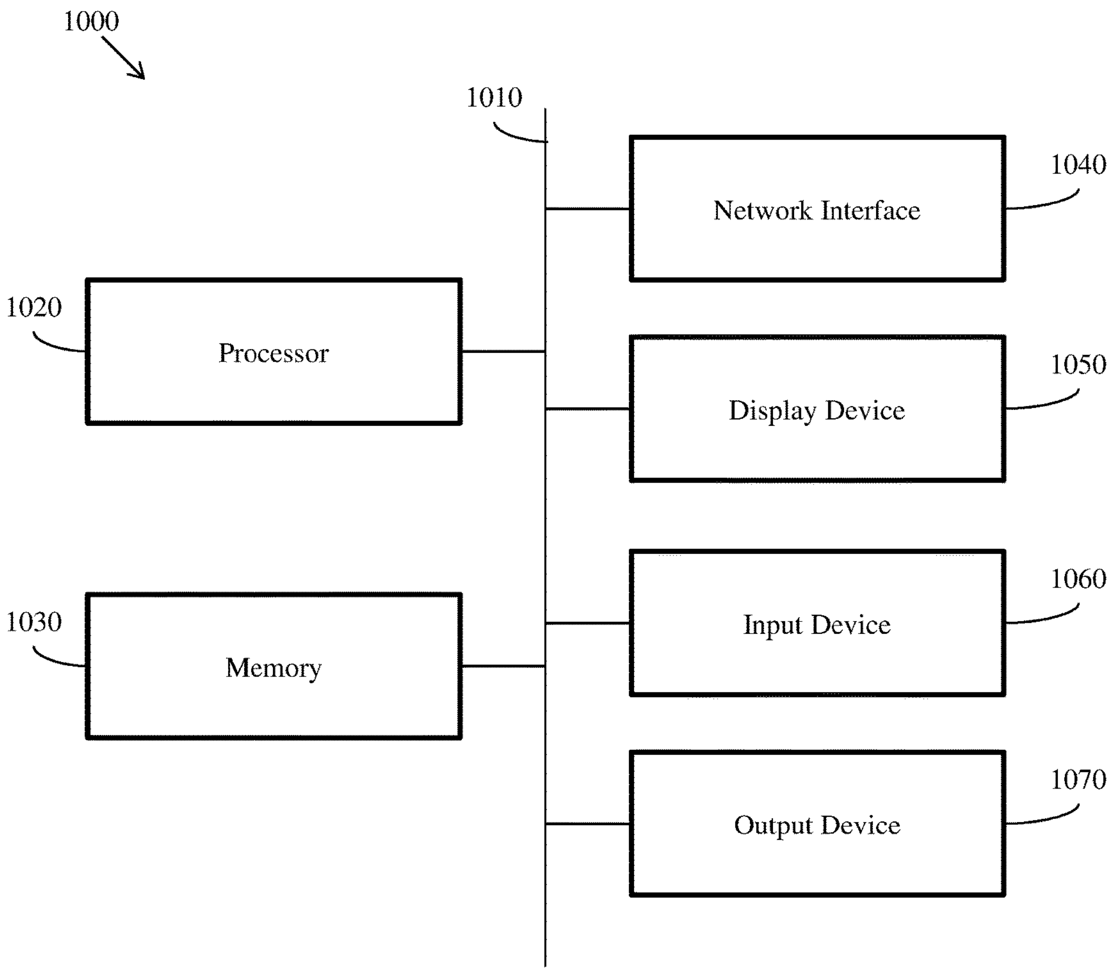
FIG. 10 illustrates a block diagram of an exemplary client device according to an embodiment.

FIG. 10 illustrates a block diagram of an exemplary client device 1000 according to an embodiment. The client device 1000 may be similar to the client device 100 discussed above, for example.

The client device 1000 includes a bus 1010, a processor 1020, a memory 1030, a network interface 1040, a display device 1050, an input device 1060, and an output device 1070. The client device 1000 may include additional, different, or fewer components. For example, multiple buses, multiple processors, multiple memory devices, multiple network interfaces, multiple display devices, multiple input devices, multiple output devices, or any combination thereof, may be provided. As another example, the client device 1000 may not include an output device 1070 separate from the display device 1050. As another example, the client device 1000 may not include an input device 1060. Instead, for example, the client device 1000 may be controlled by an external or remote input device via the network interface 1040.

The bus 1010 may include a communication bus, channel, network, circuit, switch, fabric, or other mechanism for communicating data between components in the client device 1000. The bus 1010 may be communicatively coupled with and transfer data between any of the components of the client device 1000. For example, during an installation process of a trading application, one or more computer-readable instructions that are to be executed by the processor 1020 may be transferred from an input device 1060 and/or the network interface 1040 to the memory 1030. When the client device 1000 is running or preparing to run the trading application stored in the memory 1030, the processor 1020 may retrieve the instructions from the memory 1030 via the bus 1010.

The processor 1020 may include a general processor, digital signal processor, application specific integrated circuit, field programmable gate array, analog circuit, digital circuit, programmed processor, combinations thereof, or other now known or later developed processing device. The processor 1020 may be a single device or a combination of devices, such as associated with a network or distributed processing. Any processing strategy may be used, such as multi-processing, multi-tasking, parallel processing, and/or remote processing, for example. Processing may be local or remote and may be moved from one processor to another processor.

The processor 1020 may be operable to execute logic encoded in one or more tangible media, such as memory 1030 and/or via network device 1040. As used herein, logic encoded in one or more tangible media includes instructions that are executable by the processor 1020 or a different processor. The logic may be stored as part of software, hardware, integrated circuits, firmware, and/or micro-code, for example. The logic may be received from an external communication device via a communication network, for example, connected to the Internet. The processor 1020 may execute the logic to perform the functions, acts, or tasks illustrated in the figures or described herein.

The memory 1030 may be tangible media, such as computer readable storage media, for example. Computer readable storage media may include various types of volatile and non-volatile storage media, including but not limited to random access memory, read-only memory, programmable read-only memory, electrically programmable read-only memory, electrically erasable read-only memory, flash memory, magnetic tape or disk, optical media, any combination thereof, or any other now known or later developed tangible data storage device. The memory 1030 may include a single device or multiple devices. For example, the memory 1030 may include random access memory and hard drive storage. The memory 1030 may be adjacent to, part of, programmed with, networked with, and/or remote from processor 1020, such that data stored in the memory 1030 may be retrieved and processed by the processor 1020, for example.

The memory 1030 may store instructions that are executable by the processor 1020. The instructions may be executed to perform one or more of the acts or functions described herein or shown in the figures.

The network interface 1040 may be a one-way or two-way communication coupling. Accordingly, the network interface 1040 may communicatively connect one, two, or more communication networks or devices. For example, the bus 1010 may be coupled with a gateway similar to gateway 120 discussed above via the network interface 1040, such that one, some, or all of the components of the computing device 1000 are accessible or can communicate with the gateway. As another example, the network interface 1040 may couple the bus 1010 with other communication networks. The network interface 1040 may be, for example, an integrated services digital network (ISDN) card or a modem to provide a data communication connection. As another example, network interface 1040 may be a local area network (LAN) card to provide a data communication connection to a compatible LAN, for example, connected to the Internet. Wireless links may also be implemented. The network interface 1040 may send and receive electrical, electromagnetic, or optical signals that carry analog or digital data streams representing various type of information, for example.

The display device 1050 may include a visual output device, cathode ray tube (CRT) display, electronic display, electronic paper, flat panel display, light-emitting diode (LED) displays, electroluminescent display (ELD), plasma display panels (PDP), liquid crystal display (LCD), thin-film transistor displays (TFT), organic light-emitting diode displays (OLED), surface-conduction electron-emitter display (SED), laser television, carbon nanotubes, nanocrystal displays, head-mounted display, projector, three-dimensional display, transparent display device, and/or other now known or later developed display, for example.

The display device 1050 is adapted to display a trading screen. The trading screen may be similar to the trading screens discussed above, for example. The trading screen may be interactive. An interactive trading screen may allow, for example, one or more trading actions to be performed using the trading screen. For example, an interactive trading screen may allow one or more order entry parameters to be set and/or sent using one or more order entry actions. The display device 1050 and/or input device 1060 may be used to interact with the trading screen, for example.

The input device 1060 may include a keyboard, mouse, microphone, touch-screen, trackball, keypad, joystick, and/or other device for providing input, for example. The input device 1060 may be used, for example, to provide command selections to processor 1020. For example, the input device 1060 may be a mouse that is used to control a cursor displayed on a trading screen. The mouse may include one or more buttons for selection and control, for example.

The output device 1070 may include a keyboard, mouse, speakers, touch-screen, trackball, keypad, haptic device or system, joystick, and/or other device for providing output, for example. For example, the output device 1070 may be used to output one or more signals, such as a haptic signal or an audio signal, to a user.

Figure 11:
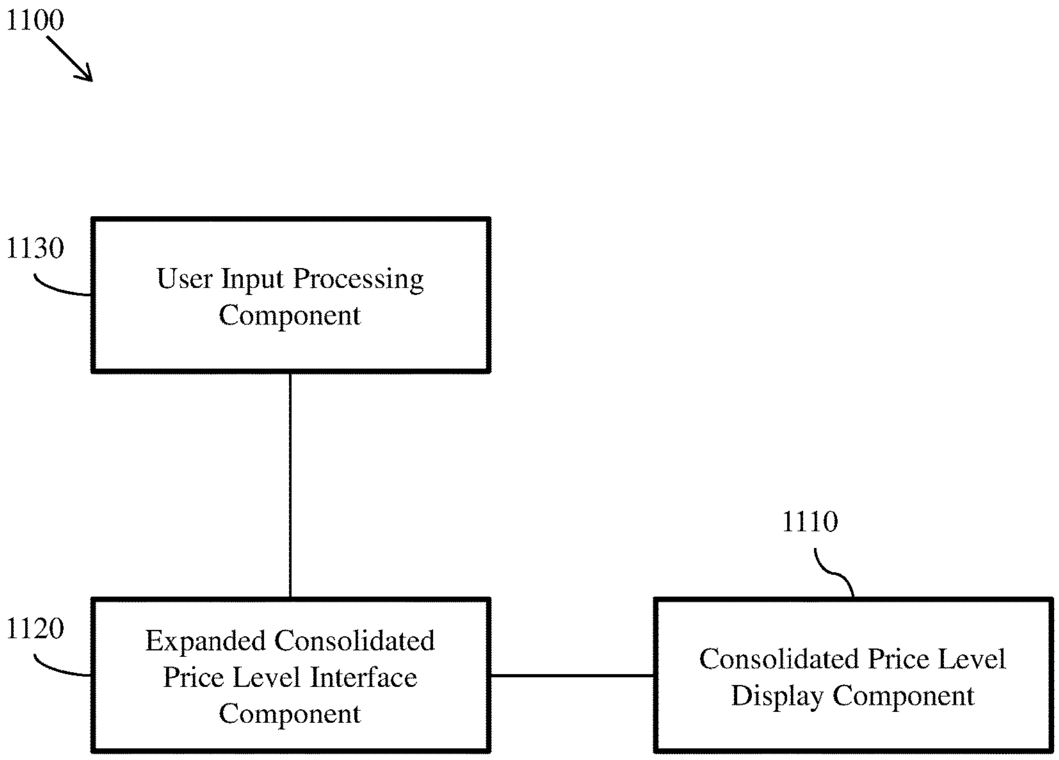
FIG. 11 illustrates a block diagram for an example system according to an embodiment.

FIG. 11 illustrates a block diagram for an example system 1100 according to an embodiment. The system 1100 includes a consolidated price level display component 1110, an expanded consolidated price level interface component 1120, and a user input processing component 1130.

The expanded consolidated price level interface component 1120 is in communication with the consolidated price level display component 1110 and the user input processing component 1130.

In operation, the consolidated price level display component 1110 is adapted to display consolidated price level data. The consolidated price level data is for a consolidated price level representing at least two price levels of a tradeable object. The consolidated price level data includes consolidated data based on the data associated with the at least two price levels of the consolidated price level.

The consolidated price level display component 1110 may be part of a trading application which displays the consolidated price level data in a trading interface similar to those discussed above, for example.

The expanded consolidated price level interface component 1120 is adapted to generate an expanded consolidated price level interface. The expanded consolidated price level interface may be similar to the expanded consolidated price level interfaces discussed above, for example.

The expanded consolidated price level interface component 1120 generates the expanded consolidated price level interface for a consolidated price level displayed by the consolidated price level display component 1110. The expanded consolidated price level interface component 1120 generates the expanded consolidated price level interface based on some or all of the data associated with the price levels represented by the consolidated price level to be expanded.

The expanded consolidated price level interface component 1120 is adapted to display the generated expanded consolidated price level interface. The expanded consolidated price level interface component 1120 may be part of a trading application which displays the expanded consolidated price level interface in a trading interface similar to those discussed above, for example.

The user input processing component 1130 is adapted to process input from a user. The input may be received from a user input device, for example. The user input processing component 1130 is adapted to determine if a command to generate and display an expanded consolidated price level interface is received in the input. If so, the command is provided to the expanded consolidated price level interface component 1120 so that the expanded consolidated price level interface may be generated in response to the command.

In certain embodiments, the user input processing component 1130 is adapted to determine if a command to maintain the display of the expanded consolidated price level interface so that it may be interacted with is received in the input. If so, the command is provided to the expanded consolidated price level interface component 1120 so that the expanded consolidated price level interface may be interacted with.

In certain embodiments, the user input processing component 1130 is adapted to determine if a command to enter and/or manipulate an order using the expanded consolidated price level interface is received in the input. If so, the command may be provided to a trading application so that an order may be generated, altered, and/or cancelled in response to the command.

The components, elements, and/or functionality of the system 1100 discussed above may be implemented alone or in combination in various forms in hardware, firmware, and/or as a set of instructions in software, for example. Certain embodiments may be provided as a set of instructions residing on a computer-readable medium, such as a memory, hard disk, CD-ROM, DVD, and/or EPROM, for execution on a general purpose computer or other processing device.

Figure 12:
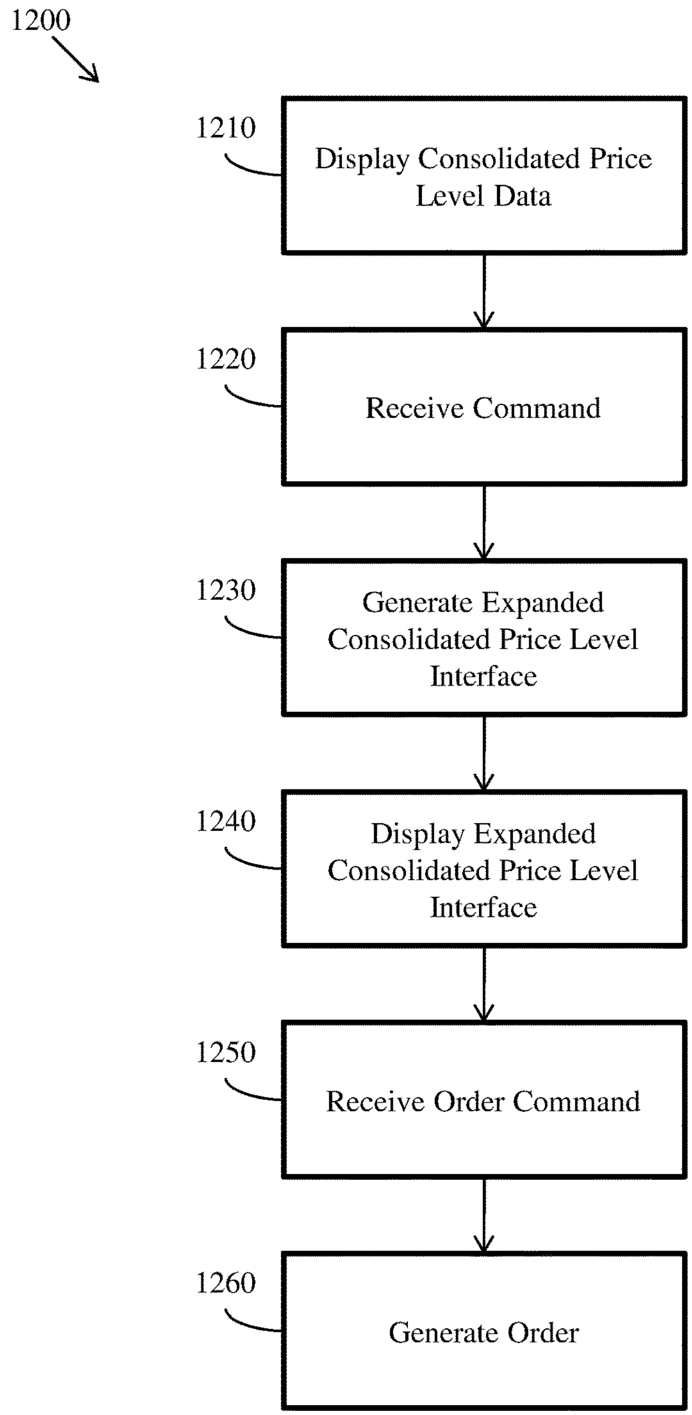
FIG. 12 illustrates a flowchart of a method according to an embodiment.

FIG. 12 illustrates a flowchart 1200 of a method according to an embodiment. The method includes the following steps which will be described below in more detail. At step 1210, consolidated price level data is displayed. At step 1220, a command is received. At step 1230, an expanded consolidated price level interface is generated. At step 1240, an expanded consolidated price level interface is displayed. At step 1250, an order command is received. At step 1260, an order is generated. The method is described with reference to elements of systems discussed above, but it should be understood that other implementations are possible.

At step 1210, consolidated price level data is displayed. The consolidated price level data may be displayed by a consolidated price level display component similar to the consolidated price level display component 1110 discussed above, for example. The consolidated price level data is for a consolidated price level representing at least two price levels of a tradeable object. The consolidated price level data includes consolidated data based on the data associated with the at least two price levels of the consolidated price level.

The consolidated price level data may be displayed in a trading interface similar to those discussed above, for example.

At step 1220, a command is received. The command may be received by a user input processing component similar to the user input processing component 1130 discussed above, for example. The command may be similar to the command to generate and display an expanded consolidated price level interface discussed above, for example.

At step 1230, an expanded consolidated price level interface is generated. The expanded consolidated price level interface may be generated by an expanded consolidated price level interface component similar to the expanded consolidated price level interface component 1120 discussed above, for example. The expanded consolidated price level interface is generated in response to the command received at step 1220 discussed above.

The expanded consolidated price level interface may be similar to the expanded consolidated price level interfaces discussed above, for example. The expanded consolidated price level interface is generated for a consolidated price level. The consolidated price level may be the consolidated price level displayed at step 1210 discussed above, for example. The expanded consolidated price level interface is generated based on some or all of the data associated with the price levels represented by the consolidated price level to be expanded.

At step 1240, an expanded consolidated price level interface is displayed. The expanded consolidated price level interface may be displayed by an expanded consolidated price level interface component similar to the expanded consolidated price level interface component 1120, discussed above, for example. The expanded consolidated price level interface may be displayed in a trading interface similar to those discussed above, for example.

At step 1250, an order command is received. The order command may be received by a user input processing component similar to the user input processing component 1130 discussed above, for example. The order command may be a command to enter and/or manipulate an order using the expanded consolidated price level interface.

At step 1260, an order is generated. The order is generated in response to the order command received at step 1250 discussed above. The order may be generated by a trading application based on the order command.

In certain embodiments, the order command is a command to manipulate and/or cancel an existing order rather than place a new order, in which case a message to manipulate and/or cancel the order is generated rather than generating a new order.

One or more of the steps of the method 1200 discussed above may be implemented alone or in combination in various forms in hardware, firmware, and/or as a set of instructions in software, for example. Certain embodiments may be provided as a set of instructions residing on a computer-readable medium, such as a memory, hard disk, CD-ROM, DVD, and/or EPROM, for execution on a general purpose computer or other processing device.

Certain embodiments may omit one or more of these steps and/or perform the steps in a different order than the order listed. For example, some steps may not be performed in certain embodiments. As a further example, certain steps may be performed in a different temporal order, including simultaneously, than listed above.

While the present inventions have been described with reference to certain embodiments, it will be understood by those skilled in the art that various changes may be made and equivalents may be substituted without departing from the scope of the inventions. In addition, many modifications may be made to adapt a particular situation or material to the teachings of the inventions without departing from their scope. Therefore, it is intended that the inventions not be limited to the particular embodiments disclosed, but that the inventions will include all embodiments falling within the scope of the claims.

The invention claimed is:

1. A method including:

displaying by a computing device consolidated price level data for a consolidated price level, wherein the consolidated price level represents at least two price levels of a tradeable object, wherein the consolidated price level data includes consolidated data for the at least two price levels;

receiving by the computing device a command from a user input device;

generating by the computing device an expanded consolidated price level interface for the consolidated price level automatically in response to the command, wherein the expanded consolidated price level interface includes un-consolidated data associated with each of the at least two price levels of the consolidated price level; and displaying by the computing device the expanded consolidated price level interface automatically in response to generating the expanded consolidated price level interface, wherein a first price level of the at least two price levels corresponds to the consolidated price level, wherein the expanded consolidated price level interface is positioned such that the first price level is aligned with the consolidated price level.

2. The method of claim 1, wherein the expanded consolidated price level interface is one of the group of: a pop-up interface and an in-line interface.

3. The method of claim 1, wherein the command includes positioning a cursor in a region associated with the consolidated price level data.

4. The method of claim 3, wherein the positioning of the cursor is based on an input from a touch screen.

5. The method of claim 3, wherein the expanded consolidated price level interface is displayed automatically in response to the positioning of the cursor.

6. The method of claim 3, wherein the expanded consolidated price level interface is displayed automatically after the cursor has been positioned in the region associated with the consolidated price level data for a predetermined period of time.

7. The method of claim 1, wherein the expanded consolidated price level interface is displayed based on a location of a cursor.

8. The method of claim 1, wherein the expanded consolidated price level interface is displayed in place of the consolidated price level data.

9. The method of claim 1, wherein the expanded consolidated price level interface is displayed at a predefined location.

10. The method of claim 1, wherein the expanded consolidated price level interface includes at least a subset of the un-consolidated data associated with each of the at least two price levels of the consolidated price level.

11. The method of claim 1, wherein the un-consolidated data of the expanded consolidated price level interface is updated when updated market data is received.

12. The method of claim 1, wherein the expanded consolidated price level interface is configured to receive an order command to place an order for the tradeable object.

* * * * *